(12) United States Patent
Sano

(10) Patent No.: US 6,706,465 B1
(45) Date of Patent: Mar. 16, 2004

(54) OPTICAL DISK STAMPER MASTERING METHOD AND APPARATUS

(75) Inventor: Kazuhiko Sano, Hyogo-ken (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/631,979

(22) Filed: Aug. 3, 2000

(30) Foreign Application Priority Data

| Sep. 1, 1999 | (JP) | ............ 11-247349 |
| Jun. 30, 2000 | (JP) | ............ 2000-198784 |
| Jun. 30, 2000 | (JP) | ............ 2000-198795 |

(51) Int. Cl.⁷ .................................................. G11B 7/24
(52) U.S. Cl. ........................ 430/320; 430/321; 216/24; 216/58; 216/74; 216/75
(58) Field of Search ................ 430/320, 321, 430/330, 323, 331; 216/24, 58, 74, 75

(56) References Cited

U.S. PATENT DOCUMENTS

| 4,724,043 A | * | 2/1988 | Bergendahl et al. ........... 216/2 |
| 5,051,340 A | * | 9/1991 | Tyan et al. .................. 430/321 |
| 5,094,936 A | * | 3/1992 | Misium et al. .............. 430/323 |
| 5,304,453 A | * | 4/1994 | Lin ............................. 430/252 |
| 5,347,510 A | * | 9/1994 | Hirokane et al. ........... 430/323 |
| 5,480,763 A | * | 1/1996 | Kondo et al. ................ 430/320 |
| 5,503,963 A | * | 4/1996 | Bifano ........................ 430/321 |
| 5,521,030 A | * | 5/1996 | McGrew ...................... 430/320 |
| 5,783,371 A | | 7/1998 | Bifano ........................ 430/320 |
| 5,979,772 A | * | 11/1999 | Takei et al. ................. 235/487 |
| 6,156,243 A | * | 12/2000 | Kosuga et al. ............... 264/2.5 |
| 6,207,247 B1 | * | 3/2001 | Morita ................... 430/270.11 |
| 6,331,378 B1 | * | 12/2001 | Endo .......................... 430/314 |

FOREIGN PATENT DOCUMENTS

| JP | 60-173736 | * | 9/1985 |
| JP | 60-173738 | * | 9/1985 |
| JP | 63-071957 | * | 4/1988 |
| JP | 63-131351 | * | 6/1988 |
| JP | 03-198237 | * | 8/1991 |
| JP | 03-252935 | * | 11/1991 |
| JP | 04-259937 | * | 9/1992 |
| JP | 06-302017 | * | 10/1994 |
| JP | 11-007662 | * | 1/1999 |
| JP | 11-153867 | * | 6/1999 |

OTHER PUBLICATIONS

O'Brian & Sloan, "Resists in Microlithography", in Microelectronic Processing:Chemical Engineering Aspects, Advances in Chemistry Series, vol. 221, Hess et al. (Ed), pp. 350–353 and 356–359.*

"Silylation method to enhance the contrast of reactive ion etched images", IBM Technical Disclosure Bulletin vol.32(2) pp. 14–16 (Jul./1989).*

* cited by examiner

*Primary Examiner*—Martin Angebranndt
(74) *Attorney, Agent, or Firm*—Wenderoth, Lind & Ponack, L.L.P.

(57) ABSTRACT

A substrate with a negative type photoresist applied rotates and is continuously subjected to surface exposure, heating, and developing/etching/removing the resist each in a dry process. As a result, signal projections are formed onto the surface, which is machined to a stamper size.

3 Claims, 11 Drawing Sheets

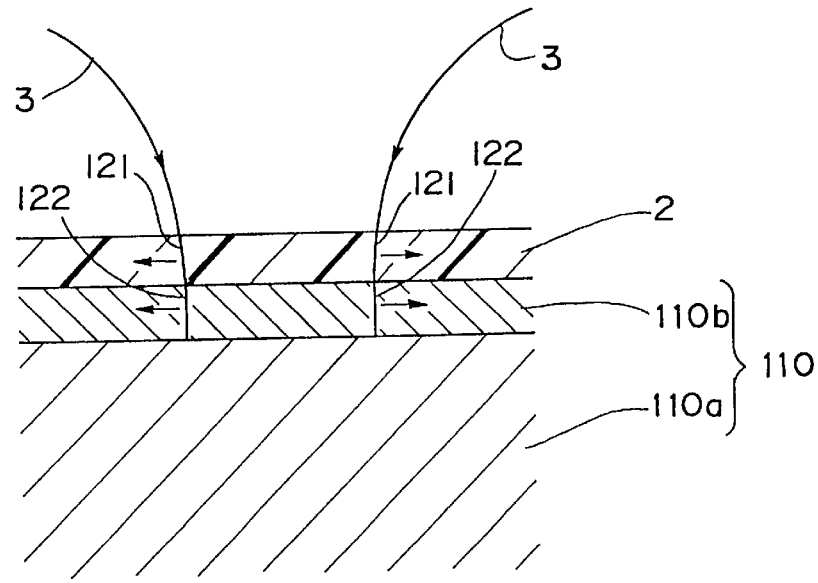
Fig. 10
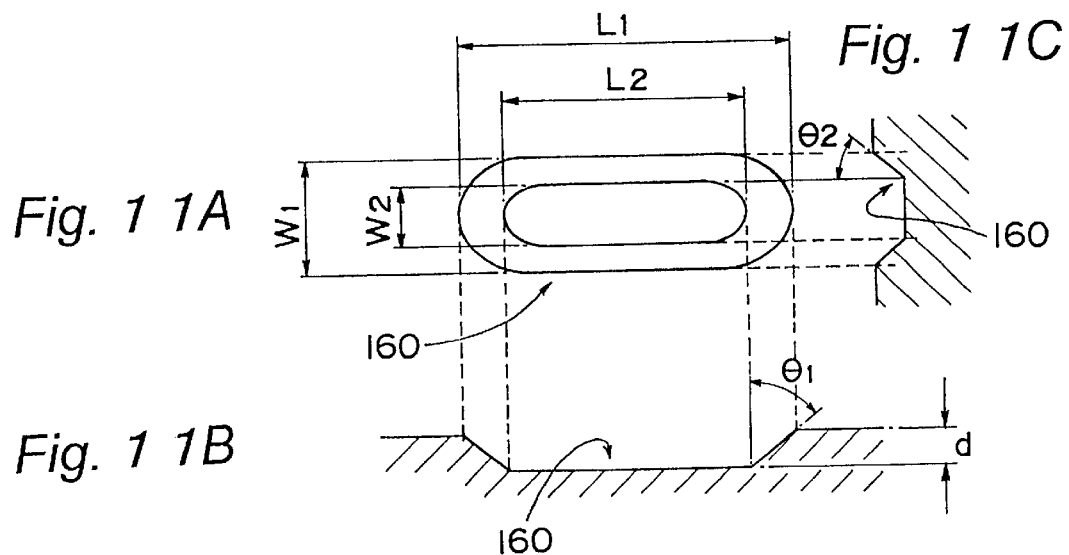
Fig. 11A
Fig. 11B
Fig. 11C

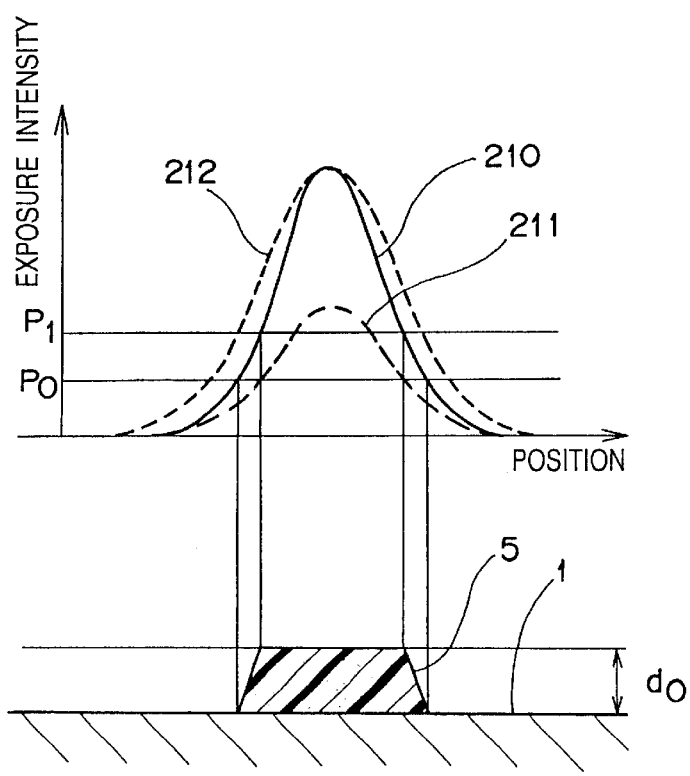

OPTICAL DISK STAMPER MASTERING METHOD AND APPARATUS

BACKGROUND OF THE INVENTION

A process of forming a master for optical disks, generally referred to as "mastering", is where a nickel or the like metallic master, i.e., "stamper", is formed at its final step. A large number of optical disks are duplicated with use of the stamper as a mold in a succeeding molding process. Through dry etching, the present invention relates to a direct dry mastering stamper for optical disks, a method and an apparatus for direct dry mastering a stamper for optical disks whereby the stamper is manufactured in a reduced number of steps in a short time at low costs with a high yield as compared with the prior art, and an optical disk formed with use of the stamper.

A conventional mastering process will be described with reference to FIGS. 5A–5G.

In FIG. 5A, 31 is a glass substrate to which a positive type photoresist is applied thereby forming a resist layer 32. A signal-modulated laser beam 3 is converged to a size of sub microns by a recording lens 4 to expose the glass substrate as shown in FIG. 5B. A developing solution is applied from a nozzle 33 onto the glass substrate 31, whereby the exposed part is etched and removed, as shown in FIG. 5C. Fine dents 34 called "pits", namely, signal pits, are formed on the photoresist layer 32. The glass substrate 31 is then heated by baking, so that a film of the photoresist layer 32 is stabilized (FIG. 5D). A metallic conductive coat 35 is formed onto the photoresist layer 32 by sputtering or the like manner (FIG. 5E). Thereafter, with using the metallic conductive coat 35 as an electrode, nickel plating is carried out when a nickel thick film 36 of a thickness of approximately 0.3 mm is formed on the metallic conductive coat 35 (FIG. 5F). A replica of the pits on the photoresist layer is formed to the nickel thick film 36.

The nickel thick film 36 is peeled off the glass base 31 as shown in FIG. 5G. A rear face of the thick film is polished, and inner and outer diameters are punched to conform to a molding machine. An optical disk master, that is, stamper, is thus completed.

The mastering process of forming the stamper as described hereinabove includes chemical treatment steps such as development, electroforming, and the like. In general, the chemical treatment is varied in quality and worsened in yield without strict management on production environments such as chemical liquids to be used, devices to be used, temperatures, humidities, and the like. According to the inventors' experience, further, a wet process such as the aforementioned ones cause defects on the stamper with high probability because most surface foreign particles and specks adhere or are generated when the stamper is dried from the wet state. Particularly, in accordance with a signal density increase of optical disks, the pits are required to be formed in a micro-structure of a size of sub microns, and therefore, even a minute speck or a little quantity of adhering foreign particles impairs the stamper.

Pits are formed in a chemical liquid in the conventional process. More specifically, the pits are formed to a front face of the resist layer in the developing solution and signal projections of nickel along the pits are formed in the plating solution. Under these circumstances, a degree of cleanness is hard to manage and the foreign particles or the like are prone to adhere.

Then, the pits (dents) formed to the photoresist layer on the glass base through exposure and development are transferred as projections (bumps) to a metal plate of nickel by electroforming to form the stamper. The number of steps is large and, a quality and a yield are decreased due to defects brought about in the process. Facility costs and material costs are also disadvantageously high.

The object of the present invention is, therefore, to provide a direct dry mastering stamper for optical disks, a method and an apparatus for direct dry mastering a stamper for optical disks whereby a degree of cleanness is easy to manage, adhesion of foreign particles or the like can be reduced, the number of production steps for the stamper is reduced by directly dry etching a metallic, ceramic, or the like substrate without electroforming or the like process, and a quality and a productivity can be improved and, an optical disk formed with use of the stamper.

SUMMARY OF THE INVENTION

In order to achieve the aforementioned objective, the present invention is constituted as follows.

According to a first aspect of the present invention, there is provided a method for mastering a stamper for optical disks. The method includes: irradiating laser beams signal-modulated and converged by a recording lens to a surface of a substrate while rotating the substrate having a resist layer formed of a negative type photoresist, thereby forming exposed and unexposed parts; thereafter, continuously executing heating, developing in a dry process, etching in a dry process, and removing the resist in a dry process, thereby forming signal projections to the surface of the substrate; and thereafter, machining the substrate to a stamper size conforming to a mold of an optical disk-molding machine, thereby forming an optical disk stamper.

According to a second aspect of the present invention, there is provided a method for mastering a stamper for optical disks. This method includes: irradiating laser beams signal-modulated and converged by a recording lens to a surface of a substrate while rotating the substrate having a resist layer formed of a negative type resist and machined to a stamper size conforming to a mold of an optical disk-molding machine, thereby forming exposed and unexposed parts; and thereafter, heating, and then carrying out developing in a dry process, etching in a dry process, and removing the resist in a dry process, thereby forming an optical disk stamper.

According to a third aspect of the present invention, there is provided a method for mastering a stamper for optical disks according to the first aspect, wherein the heating after irradiating the laser beams is carried out in an organic Si gas ambience of hexamethyl dislazane or the like.

According to a fourth aspect of the present invention, there is provided a method for mastering a stamper for optical disks according to the first aspect, wherein the developing, the etching, and the removing of the resist are carried out in the same chamber by changing reaction gases.

According to a fifth aspect of the present invention, there is provided a method for mastering a stamper for optical disks according to the first aspect, wherein the stamper substrate having the negative type resist layer provided to a front face thereof is formed of a material essentially consisting of at least one of nickel, chromium, aluminum, titanium, cobalt, iron, molybdenum, tungsten, boron, copper, and tantalum.

According to a sixth aspect of the present invention, there is provided a method for mastering a stamper for optical disks according to the first aspect, wherein the stamper substrate having the negative type resist layer provided to a front face thereof is formed of a silicon compound of Si, SiO$_2$, SiC, or the like.

According to a seventh aspect of the present invention, there is provided a method for mastering a stamper for optical disks according to the first aspect, wherein the stamper substrate having the negative type resist layer provided to a front face thereof is formed of glass.

According to an eighth aspect of the present invention, there is provided a method for mastering a stamper for optical disks according to the first aspect, wherein the stamper substrate having the negative type resist layer provided to a front face thereof is formed of a material essentially consisting of carbon.

According to a ninth aspect of the present invention, there is provided a method for mastering a stamper for optical disks according to the first aspect, wherein the dry etching layer of the stamper substrate having the negative type resist layer provided to a front face thereof is formed of titanium nitride, titanium oxide, tantalum, tungsten, chromium, molybdenum, cobalt, boron, nickel phosphor, nickel boron, or nickel cobalt.

According to a 10th aspect of the present invention, there is provided a method for mastering a stamper for optical disks according to the ninth aspect, wherein the stamper substrate is constructed in a double layer structure of a base layer and a dry etching layer which is disposed on the base layer and is to be partly removed by dry etching thereby forming the signal projections, and a thickness of the dry etching layer is equal to an etching depth at the etching.

According to an 11th aspect of the present invention, there is provided an apparatus for mastering a stamper for optical disks. The apparatus comprises: a rotating apparatus for rotating a stamper substrate having a resist layer of a negative type photoresist provided to a front face thereof; and an exposing apparatus for irradiating laser beams signal-modulated and converged by a recording lens to the front face of the rotating stamper substrate, thereby forming exposed and unexposed parts. In addition, the apparatus comprises a processing apparatus for, after the irradiation, continuously carrying out heating, developing in a dry process, etching in a dry process, and removing the resist in a dry process, thereby forming signal projections to the front face of the stamper substrate; and a machining apparatus for machining the stamper substrate to a stamper size conforming to a mold of an optical disk-molding machine, thereby forming an optical disk stamper.

According to a 12th aspect of the present invention, there is provided an apparatus for mastering a stamper for optical disks. The apparatus comprises: a rotating apparatus for rotating a stamper substrate having a resist layer of a negative type resist provided to a front face thereof and machined to a stamper size conforming to a mold of an optical disk-molding machine; an exposing apparatus for irradiating laser beams signal-modulated and converged by a recording lens to the front face of the rotating stamper substrate, thereby forming exposed and unexposed parts; and a processing apparatus for, after the irradiation, carrying out heating, developing in a dry process, etching in a dry process and removing the resist in a dry process, thereby forming an optical disk stamper.

According to a 13th aspect of the present invention, there is provided an apparatus for mastering a stamper for optical disks according to the 11th aspect, wherein the processing apparatus carries out the heating after irradiating laser beams in an organic Si gas ambience of hexamethyl disilazane or the like.

According to a 14th aspect of the present invention, there is provided an apparatus for mastering a stamper for optical disks according to the 11th aspect, wherein the processing apparatus carries out the developing, the etching, and the removing the resist in the same chamber by changing reaction gases alone.

According to a 15th aspect of the present invention, there is provided an apparatus for mastering a stamper for optical disks according to the 11th aspect, wherein the stamper substrate having the negative type resist layer provided to the front face thereof is formed of a material essentially consisting of at least one of nickel, chromium, aluminum, titanium, cobalt, iron, molybdenum, tungsten, boron, copper, and tantalum.

According to a 16th aspect of the present invention, there is provided an apparatus for mastering a stamper for optical disks according to the 11th aspect, wherein the stamper substrate having the negative type resist layer provided to the front face thereof is formed of a silicon compound of Si, SiO$_2$, SiC, or the like.

According to a 17th aspect of the present invention, there is provided an apparatus for mastering a stamper for optical disks according to the 11th aspect, wherein the stamper substrate having the negative type resist layer provided to the front face thereof is formed of glass.

According to an 18th aspect of the present invention, there is provided an apparatus for mastering a stamper for optical disks according to the 11th aspect, wherein the stamper substrate having the negative type resist layer provided to the front face thereof is formed of a material essentially consisting of carbon.

According to a 19th aspect of the present invention, there is provided an apparatus for mastering a stamper for optical disks according to the 11th aspect, wherein the stamper substrate having the negative type resist layer provided to the front face thereof is constructed in a double layer structure of a base layer and a dry etching layer which is disposed on the base layer and is to be partly removed by dry etching thereby forming the signal projections, and the dry etching layer is formed of titanium nitride, titanium oxide, tantalum, tungsten, chromium, molybdenum, cobalt, boron, nickel phosphor, nickel boron, or nickel cobalt.

According to a 20th aspect of the present invention, there is provided an apparatus for mastering a stamper for optical disks according to the 19th aspect, wherein the stamper substrate is constructed in a double layer structure of the base layer and the dry etching layer which is disposed on the base layer and is to be partly removed by dry etching thereby forming the signal projections, and a thickness of the dry etching layer is equal to an etching depth at the etching.

According to a 21st aspect of the present invention, there is provided a mastering stamper for use in molding optical disks with using a stamper substrate itself as the stamper, which is formed by irradiating signal-modulated laser beams to a rotating stamper substrate having a resist layer provided to a front face thereof, heating the resist layer on the stamper substrate, thereafter removing exposed parts or unexposed parts of the resist layer by developing thereby forming, to the resist layer, projecting parts for forming signal projections, and forming signal projections to the stamper substrate by dry etching using the resist layer having the formed projecting parts as a signal projection form mask, the stamper substrate being constituted of a material of a ($\rho \times c$) value larger than a ($\rho \times c$) value of glass wherein $\rho$ is a density and $c$ is a specific heat.

According to a 22nd aspect of the present invention, there is provided a mastering stamper for use in molding optical disks using a stamper substrate itself as the stamper, which is formed by irradiating signal-modulated laser beams to a rotating stamper substrate having a resist layer provided to a front face thereof, heating the resist layer on the stamper substrate, thereafter removing exposed parts or unexposed parts of the resist layer by developing thereby forming, to the resist layer, projecting parts for forming signal projections, and forming signal projections to the stamper substrate by dry etching using the resist layer having the formed projecting parts as a signal projection form mask, the stamper substrate being constituted of a material of a thermal diffusivity larger than a thermal diffusivity of glass.

According to a 23rd aspect of the present invention, there is provided a mastering stamper according to the 21st aspect, wherein the stamper substrate is constituted of a material with a ($\rho \times c$) value not smaller than 2268 kJ/m$^3$·deg.

According to a 24th aspect of the present invention, there is provided a mastering stamper according to the 22nd aspect, wherein the stamper substrate is constituted of a material with a thermal diffusivity larger than 0.0012 m$^2$/h.

According to a 25th aspect of the present invention, there is provided a mastering stamper according to the 21st aspect, wherein the stamper substrate is constructed in a double layer structure of a base layer and a dry etching layer which is disposed on the base layer and is to be partly removed by dry etching thereby forming the signal projections.

According to a 26th aspect of the present invention, there is provided an optical disk manufactured with the use of the mastering stamper according to the 21st aspect.

According to a 27th aspect of the present invention, there is provided a method for mastering a stamper for optical disks for use in molding optical disks using a stamper substrate itself as the stamper. The method includes: irradiating signal-modulated laser beams with reducing thermal influences by heat of the stamper substrate stored at the irradiation of laser beams because of characteristics of a material itself of the stamper substrate while rotating the stamper substrate formed of a material with a ($\rho \times c$) value larger than a ($\rho \times c$) value of glass wherein $\rho$ is a density and c is a specific heat and having a resist layer provided to a front face thereof; heating the resist layer on the stamper substrate; removing exposed parts or unexposed parts of the resist layer by developing, thereby forming, to the resist layer, projecting parts for forming signal projections; and forming signal projections to the stamper substrate by dry etching with using the resist layer having the formed projecting parts as a signal projection form mask.

According to a 28th aspect of the present invention, there is provided a method for mastering a stamper for optical disks for use in molding optical disks with using a stamper substrate itself as the stamper. The method includes: irradiating signal-modulated laser beams with reducing thermal influences by heat of the stamper substrate stored at the irradiation of laser beams because of characteristics of a material itself of the stamper substrate while rotating the stamper substrate formed of a material with a thermal diffusivity larger than a thermal diffusivity of glass and having a resist layer provided to a front face thereof; heating the resist layer on the stamper substrate; removing exposed parts or unexposed parts of the resist layer by developing, thereby forming, to the resist layer, projecting parts for forming signal projections; and forming signal projections to the stamper substrate by dry etching using the resist layer having the formed projecting parts as a signal projection form mask.

According to a 29th aspect of the present invention, there is provided a direct mastering stamper according to the 25th aspect, wherein a thermal conductivity of the base layer of the stamper substrate is larger than a thermal conductivity of the etching layer.

According to a 30th aspect of the present invention, there is provided a direct mastering stamper according to the 29th aspect, wherein the base layer of the stamper substrate is formed of nickel, and the etching layer is formed of tantalum.

According to a 31st aspect of the present invention, there is provided a direct mastering stamper according to the 29th aspect, wherein the base layer of the stamper substrate is formed of aluminum or copper, and the etching layer is formed of tungsten or molybdenum.

According to a 32nd aspect of the present invention, there is provided an optical disk manufactured with the use of the direct mastering stamper according to the 29th aspect.

According to a 33rd aspect of the present invention, there is provided a method for mastering a stamper for optical disks according to the first aspect, wherein a breadth or a length of the signal projection form projecting part of the resist formed on the stamper substrate after the developing is made larger than a breadth or a length of a signal pit of the optical disk.

According to a 34th aspect of the present invention, there is provided an apparatus for mastering a stamper for optical disks according to the 11th aspect, wherein a breadth or a length of the signal projection form projecting part of the resist formed on the stamper substrate after the developing is made larger than a breadth or a length of a signal pit of the optical disk.

According to a 35th aspect of the present invention, there is provided a method for mastering a stamper for optical disks for use in molding optical disks using a stamper substrate itself as the stamper, which is formed by irradiating signal-modulated laser beams to the rotating stamper substrate having a resist layer provided to a front face thereof, heating the resist layer on the stamper substrate, thereafter removing exposed parts or unexposed parts of the resist layer by developing thereby forming, to the resist layer, projecting parts for forming signal projections, and forming signal projections to the stamper substrate by dry etching with using the resist layer having the formed projecting parts as a signal projection form mask, wherein a breadth or a length of the signal projection form projecting part of the resist formed on the stamper substrate after the developing is made larger than a breadth or a length of a signal pit of the optical disk.

According to a 36th aspect of the present invention, there is provided a method for mastering a stamper for optical disks according to the 33rd aspect, wherein a tilt angle of a side wall of the signal projection form projecting part of the resist formed on the stamper substrate after the developing is made equal to or sharper than a tilt angle of a side wall of the signal pit of the optical disk.

According to a 37th aspect of the present invention, there is provided a method for mastering a stamper for optical disks according to the 33rd aspect, wherein a breadth or a length of the signal projection form projecting part of the resist is made larger than a breadth or a length of the signal pit of the optical disk by at least a value inversely proportional to a select ratio at the time of dry etching the resist and the stamper substrate.

According to a 38th aspect of the present invention, there is provided a method for mastering a stamper for optical disks according to the 33rd aspect, wherein a tilt angle of a side wall of the signal projection form projecting part of the resist is made smaller than a tilt angle of a side wall of the signal pit of the optical disk by at least a value inversely proportional to a select ratio at the time of dry etching the resist and the stamper substrate.

According to a 39th aspect of the present invention, there is provided a method for mastering a stamper for optical disks according to the 33rd aspect, wherein the laser beams are irradiated so that a time width of a recording signal pulse of the laser beams is made longer than a time necessary for a signal pit length of the optical disk by at least a value inversely proportional to a select ratio at the time of dry etching the resist and the stamper substrate.

According to a 40th aspect of the present invention, there is provided a stamper for optical disks manufactured by the mastering method according to the 33rd aspect.

According to a 41st aspect of the present invention, there is provided a mastering stamper for optical disks to be used in molding optical disks using a stamper substrate itself as the stamper, which is formed by irradiating signal-modulated laser beams to the rotating stamper substrate having a resist layer provided to a front face thereof, heating the resist layer on the stamper substrate, thereafter removing exposed parts or unexposed parts of the resist layer by developing thereby forming, to the resist layer, projecting parts for forming signal projections, and forming signal projections to the stamper substrate by dry etching using the resist layer having the formed projecting parts as a signal projection form mask, wherein a breadth or a length of the signal projection form projecting part of the resist formed on the stamper substrate after the developing is made larger than a breadth or a length of a signal pit of the optical disk.

According to a 42nd aspect of the present invention, there is provided an optical disk manufactured with the use of the mastering stamper according to the 40th aspect.

BRIEF DESCRIPTION OF THE DRAWINGS

These and other aspects and features of the present invention will become clear from the following description taken in conjunction with the preferred embodiments thereof with reference to the accompanying drawings, in which:

FIG. 10 is a sectional view explanatory of thermal conduction at irradiation of laser beams to the conventional stamper substrate;

FIGS. 11A, 11B, and 11C are a plan view, a sectional view, and a right side view diagrammatically showing a pit shape of an optical disk;

FIGS. 14A and 14B are respectively a relationship diagram between an exposure intensity of laser beams and a position in section in the track direction of the signal projection form projecting part of the resist, and a diagram explanatory of the relationship diagram and a change in sectional size in the track direction of the signal projection form projection part of the resist according to a 10th embodiment of the present invention.

DETAILED DESCRIPTION OF THE PREFERRED EMBODIMENTS

Figure 1A:
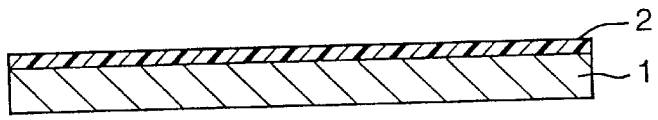
FIGS. 1A, 1B, 1C, 1D, 1E, and 1F are diagrams each indicating a step in a method for direct dry mastering a stamper for optical disks according to a first embodiment of the present invention.

Before the description of the present invention proceeds, it is to be noted that like parts are designated by like reference numerals throughout the accompanying drawings.

(First Embodiment)

A method for direct dry mastering a stamper for optical disks according to a first embodiment of the present invention will be described with reference to FIGS. 1A1–1F.

According to this method of direct dry mastering, while a stamper substrate to which a negative type photoresist to be dry-developed is applied thereby forming a resist layer is rotated, laser beams signal-modulated and converged by a recording lens are irradiated to a front face of the rotating stamper substrate, thereby forming exposed parts and unexposed parts. Thereafter, heating, development in a dry process, etching in a dry process, and removing the resist in a dry process are continuously carried out to form signal projections to the front face of the stamper substrate. Then, the stamper substrate is machined to a stamper size conforming to a mold of an optical disk-molding machine. The optical disk stamper is manufactured in this manner according to the method which will be discussed with reference to FIGS. 1A–1F.

In the first place, the negative type resist to be dry-developed is applied to a stamper substrate 1 for forming the stamper, thereby forming a resist layer 2. FIG. 1A shows the state.

Figure 1B:
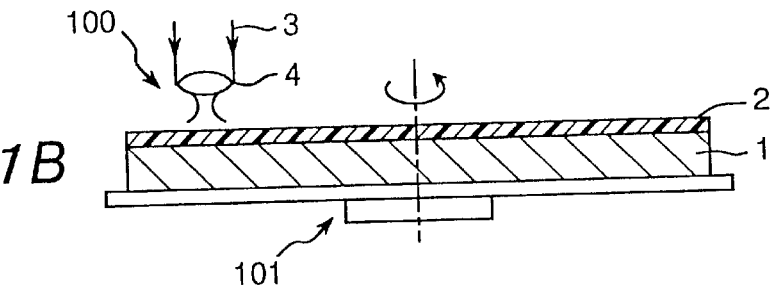

Signals are recorded by a laser beam recorder to the stamper substrate 1 of FIG. 1A. Although not shown in the drawing, the laser beam recorder includes an optical system 100 for modulating laser beams with a desired signal and irradiating the stamper substrate 1 in a radial direction, and a rotary driving apparatus 101 for rotating the above stamper substrate 1 with a desired number of revolutions. FIG. 1B illustrates laser beams 3 signal-modulated with use of the optical system 100 and, a recording lens 4 which converges the laser beams 3 to a size of sub microns and then irradiates the laser beams 3 to the resist layer 2 on the stamper substrate 1 driven and rotating by the rotary driving apparatus 101, thereby forming exposed parts and unexposed parts.

Figure 1C:
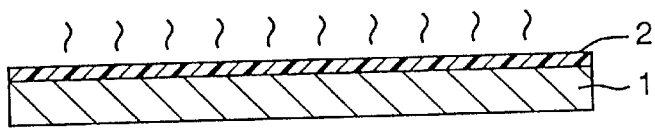

The signal-exposed stamper substrate 1 is subjected to heating in an oven or the like, that is, annealed. FIG. 1C shows the stamper substrate 1 after the annealing by the heating processing. The heating process is conducted for about 30 minutes at 130–150° C. The heat treatment brings about rearrangement of polymer chains and consequently can improve an etching resistance of the resist layer 2.

Figure 1D:
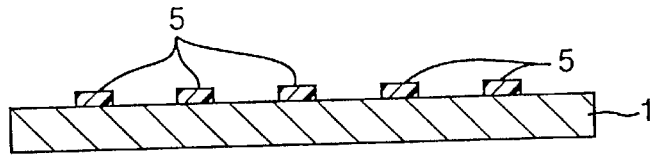

Next, development in the dry process is carried out, whereby the exposed parts on the stamper substrate 1 are left and only the unexposed parts are removed. FIG. 1D shows the stamper substrate 1 after the dry development, in which only the exposed parts of the stamper substrate 1 remain as projecting parts 5 for forming signal projections while the unexposed parts thereof are removed. The dry development is conducted with oxygen plasma. A mixture of polymethyl isopropenylketone (PMIPK) and bisazide compound is known as an example of the negative type resist that can be dry-developed.

Figure 1E:
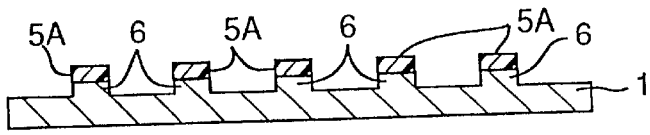

Etching in the dry process, i.e., dry etching, is performed using the projecting parts 5 as a mask for forming signal projections. The stamper substrate 1 after the etching is shown in FIG. 1E. 5A is the projecting part 5 after the etching, and 6 is the signal projection formed to the stamper substrate 1. An optimum gas is selected for the etching in accordance with the stamper substrate 1, generally, $CF_4$, $NF_3$, $BCl_3$—$Cl_3$, $Cl_3$, $CCl_4$ or the like is used.

The resist is removed in the dry process. FIG. 1F indicates a state after the resists 5A are removed by ashing, in other words, a state in which a master stamper is completed. The ashing is a step of decomposing the resist by oxygen radicals of the oxygen plasma to $CO_2$ and $H_2O$.

After the resist is removed, inner and outer diameters of the stamper substrate 1 are machined to predetermined sizes so that the stamper substrate 1 can be set to a mold of an optical disk-molding machine. The stamper is thus finished. A large number of optical disks can be duplicated with use of the mold of the optical disk-molding machine to which the stamper is set.

As described hereinabove, according to the first embodiment of the present invention, a wet process is not employed, that is, the stamper substrate after the resist is applied is kept from being wet with cleaning and chemical liquid. The stamper can be manufactured in a reduced number of steps.
(Second Embodiment)

A method for direct dry mastering a stamper for optical disks according to a second embodiment of the present invention will be described with reference to FIGS. 2A–2F.

The method is different from the above-described first embodiment in that the inner or outer diameter of the stamper substrate is machined to a stamper size conforming to a mold of an optical disk-molding machine before the resist is applied thereto. More specifically, the direct dry mastering method proceeds in procedures in which the stamper substrate to which the negative type resist is applied and which is machined to the stamper size in conformity with the mold of the optical disk-molding machine is rotated, laser beams signal-modulated and converged by the recording lens are exposed to a surface of the rotating stamper substrate, thereby forming exposed parts and unexposed parts, then the stamper substrate is subjected to heating, development in a dry process, etching in a dry process, and removing the resist in a dry process, whereby the optical disk stamper is manufactured. The method will be described with reference to FIGS. 2A–2F.

A negative type resist for dry development is applied to the stamper substrate for forming the stamper, thus forming a resist layer 12. Although 11 in FIG. 2A denotes a stamper substrate which is similar to the stamper substrate 1 in FIG. 1A, the stamper substrate 11 has already been machined to the stamper size to fit the mold of the optical disk-molding machine. The machining can be executed to the inner or outer diameter, or to both diameters. 12 is a layer of the negative type resist. The machining to the stamper size may be carried out after the application of the resist.

Similar to FIG. 1B in the first embodiment, signals are recorded by the laser beam recorder to the stamper substrate 11. FIG. 2B indicates a state of the same exposure operation as FIG. 1B.

Again similar to FIG. 1C in the first embodiment, the signal-exposed stamper substrate 11 is heated in an oven or the like and annealed. FIG. 2C represents a state of the same heating operation as FIG. 1C.

Then, development in a dry process is executed, similar to FIG. 1D of the first embodiment, so that exposed parts are left on the stamper substrate 11 while only unexposed parts are removed. FIG. 2D shows the stamper substrate 11 after the dry development in a state with projecting parts 15 of the resist layer 12 for forming signal projections being left.

Then, similar to FIG. 1E of the first embodiment, etching in a dry process, i.e., dry etching, is conducted with using the projecting parts 15 as a mask for forming signal projections. FIG. 2E shows the stamper substrate 11 after the dry etching, in which a resist layer 15 having served as the mask is left as 15A. 16 is the signal projection formed to the stamper substrate 11.

Figure 1F:
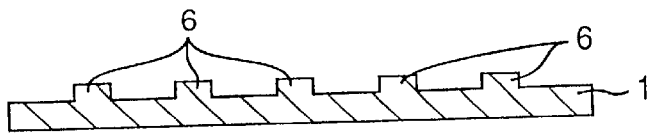

Then, similar to FIG. 1F of the first embodiment, the resist is removed in a dry process. FIG. 2F is the stamper substrate 11 after plasma ashing. Since the substrate has been already machined to the stamper size, the substrate can be directly set as a mold to the optical disk-molding machine.

Figure 2A:
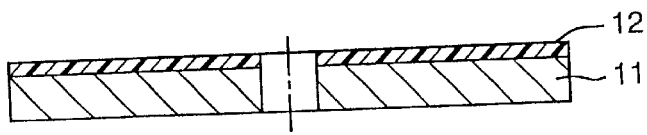
FIGS. 2A, 2B, 2C, 2D, 2E, and 2F are diagrams each indicating a step in a method for direct dry mastering a stamper for optical disks according to a second embodiment of the present invention.
Figure 2B:
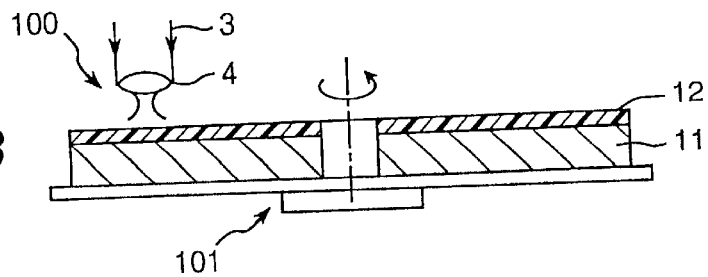
Figure 2C:
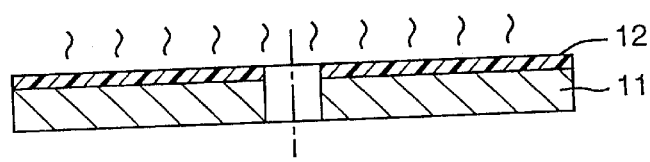
Figure 2D:
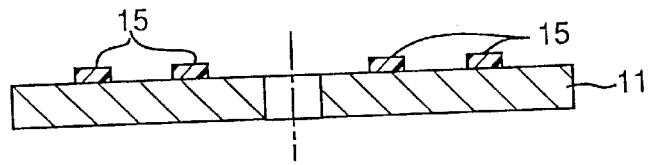
Figure 2E:
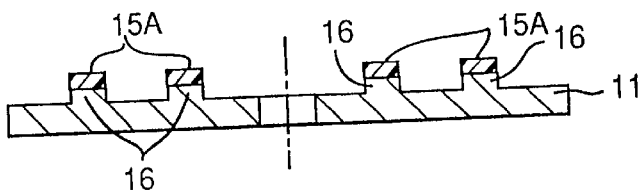
Figure 2F:
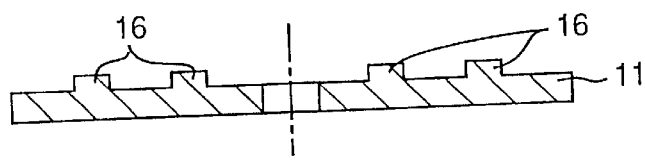

According to the second embodiment as above, with only one processing facility added for finishing the stamper substrate 11 into a state of FIG. 2A, it is enough for other post-processing factories to include facilities executing the process in FIG. 2B and thereafter, thus producing the tamper. So long as the optical system with the laser beam recorder for writing signals, the oven for the heating, and facilities for the dry development, etching, and ashing are provided, the stamper can be manufactured with the need of expensive additional facilities such as a pure water production facility, a waste disposal facility for used chemicals, cleaning solution, or the like being eliminated from each factory, unlike the conventional mastering factory.
(Third Embodiment)

FIGS. 3A–3F show a method for direct dry mastering a stamper for optical disks according to a third embodiment of the present invention.

In this direct dry mastering method, the stamper substrate to which the dry development negative type resist is applied thereby forming a resist layer has a dry etching layer provided to a front face thereof.

Figure 3A:
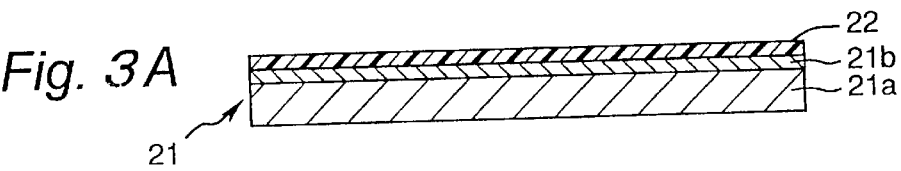
FIGS. 3A, 3B, 3C, 3D, 3E, and 3F are diagrams each indicating a step in a method for direct dry mastering a stamper for optical disks according to a third embodiment of the present invention.

Referring to FIG. 3A, 21a is a stamper substrate main body as a base layer and 21b is the dry etching layer formed on the stamper substrate main body 21a. A stamper substrate 21 is constituted of the two layers, i.e., base layer 21a and dry etching layer 21b. A thickness of the dry etching layer 21b agrees with a desired height of the signal projections to be finally formed. Supposing that an index of refraction of a molded optical disk of a synthetic resin such as polycarbonate or the like is n and a wave-length of playback-use laser beams for playing back (reading) the optical disk is $\lambda$, the height of the signal projections is generally set to be $\lambda/(4 \times n)$. A material for the dry etching layer 21b is preferably titanium nitride, titanium oxide, tantalum, tungsten, chromium, molybdenum, cobalt, boron, nickel phosphor, nickel boron, nickel cobalt, or the like. The material can be securely formed onto the nickel stamper substrate by ion plating, sputtering, vacuum vapor deposition, electroforming, electroless plating, or the like manner. The thus-obtained stamper becomes hard and sufficiently durable in use.

A negative type resist for dry development is applied onto the dry etching layer 21b on the stamper substrate main body 21a, similar to FIG. 1A of the first embodiment or FIG. 2A of the second embodiment, whereby a resist layer 22 is formed.

Figure 3B:
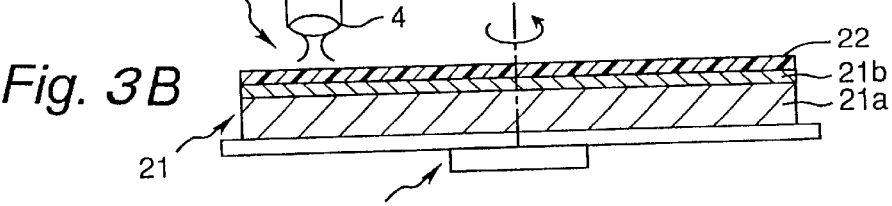

Then, similar to FIG. 1B of the first embodiment or FIG. 2B of the second embodiment, signals are recorded by the laser beam recorder onto the dry etching layer 21b of the stamper substrate main body 21a. FIG. 3B illustrates a state in which the same exposure operation as in FIG. 2B is executed.

Figure 3C:
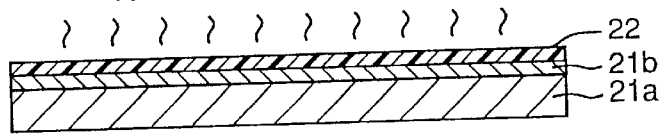

Then, similar to FIG. 1C of the first embodiment or FIG. 2C of the second embodiment, the signal-exposed stamper substrate main body 21a and the dry etching layer 21b are heated by an oven or the like and annealed. FIG. 3C shows a state of the heating operation equal to FIG. 2C.

Figure 3D:
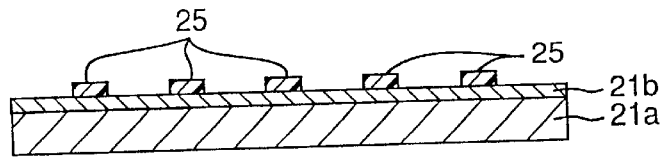

Then, similar to FIG. 1D of the first embodiment or FIG. 2D of the second embodiment, development in a dry process is carried out, whereby exposed parts are left on the dry etching layer 21b of the stamper substrate 21a and only unexposed parts are removed. FIG. 3D shows the stamper substrate 21a and the dry etching layer 21b after the dry development, in a state in which projecting parts 25 for forming signal projections, of the resist layer 22 remain without being removed.

Figure 3E:
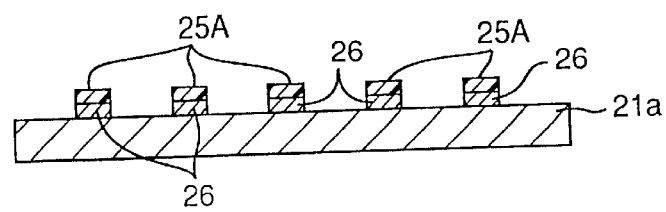
Figure 3F:
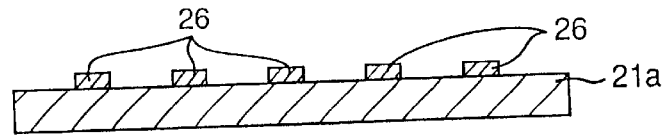

Then, similar to FIG. 1E of the first embodiment or FIG. 2E of the second embodiment, etching in a dry process, i.e., dry etching, is conducted with use of the projecting parts 25 as a mask for forming signal projections. FIG. 3E shows the stamper substrate main body 21a after the dry etching in a state wherein the resist 25 having worked as the mask remains as 25A. 26 is the signal projection formed on the dry etching layer 21b. The height of the signal projection 26 corresponds to the thickness of the dry etching layer 21b. The thickness of the dry etching layer 21b is matched to the desired height of the signal projection 26 in order to accurately detect an end point of the etching.

Then, similar to FIG. 1F of the first embodiment or FIG. 2F of the second embodiment, the resist is removed in a dry process. The stamper substrate main body 21a after the ashing becomes a master having the signal projections 26 formed to the dry etching layer 21b on the stamper substrate main body 21a as the base layer. After being processed through the same steps as in the first embodiment, the stamper is completed when inner and outer diameters of the master are machined to meet a mold of an optical disk-molding machine. Alternatively, as discussed with reference to FIGS. 2A–2F, the stamper substrate may be machined beforehand to the stamper size in the third embodiment, and in this case, the master processed through the same steps as in the second embodiment can be mounted directly as the mold to the optical disk-molding machine because of its size being already processed to the stamper size.

(Fourth Embodiment)

Figure 4:
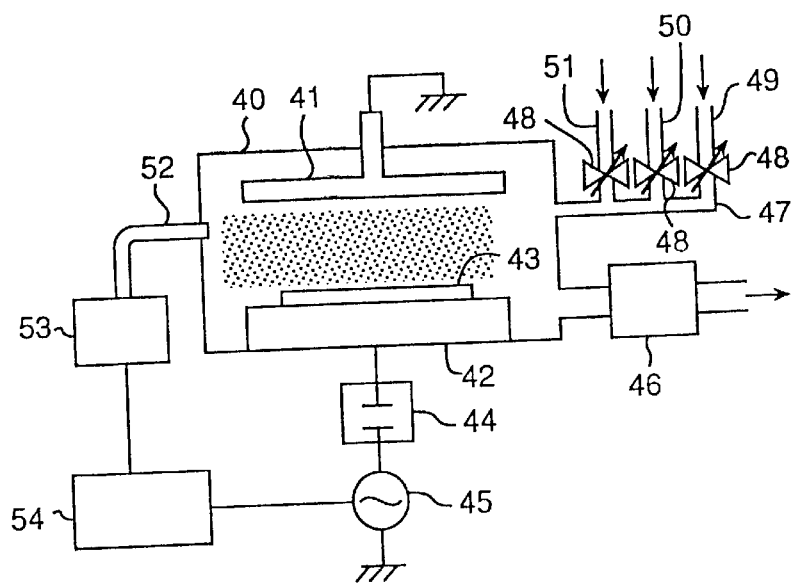
FIG. 4 is a schematic diagram of an etching apparatus in a direct dry mastering apparatus for a stamper for optical disks according to a fourth embodiment of the present invention.
Figure 5A:
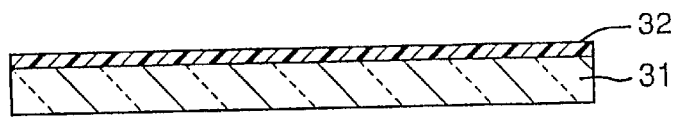
FIGS. 5A, 5B, 5C, 5D, 5E, 5F, and 5G are diagrams each showing a stamper form process in a conventional example.
Figure 5B:
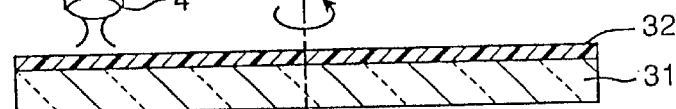
Figure 5C:
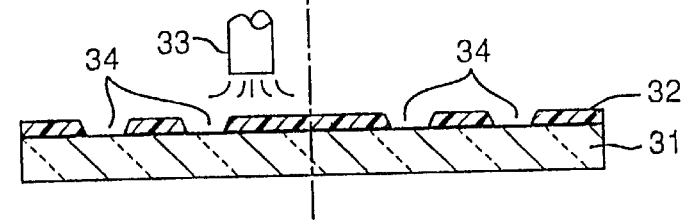
Figure 5D:
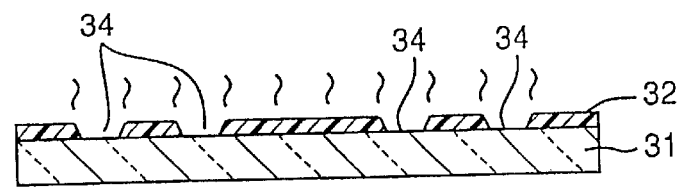
Figure 5E:
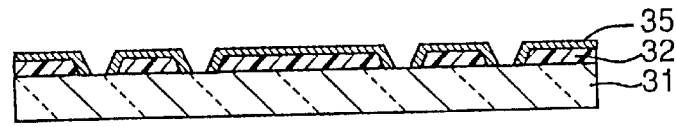
Figure 5F:
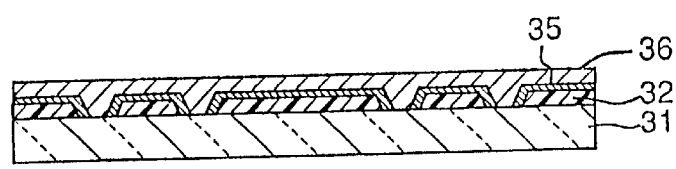
Figure 5G:
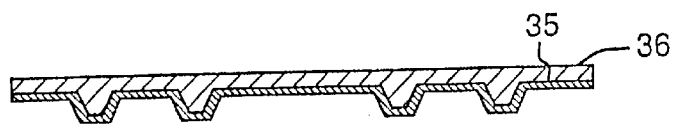

FIG. 4 schematically shows a parallel flat plate type etching apparatus for reactive ion etching in a direct dry mastering apparatus for a stamper for optical disks according to a fourth embodiment of the present invention which can be used in the methods according to the first-third embodiments and fifth through 10th embodiments of the present invention to be described later.

Figure 6:
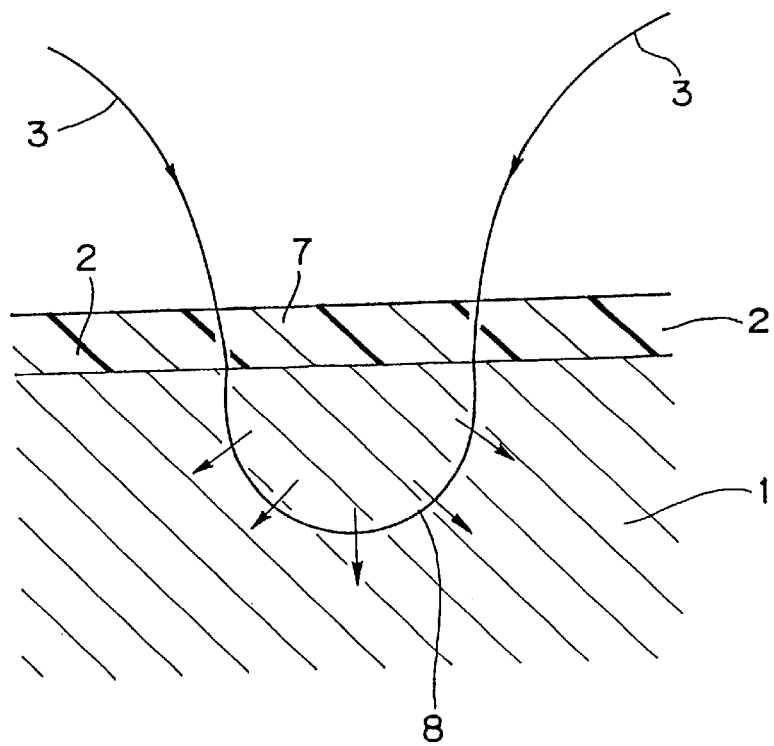
FIG. 6 is a sectional view explanatory of thermal diffusion at irradiation of laser beams to a stamper substrate according to the above fifth embodiment.
Figure 9:
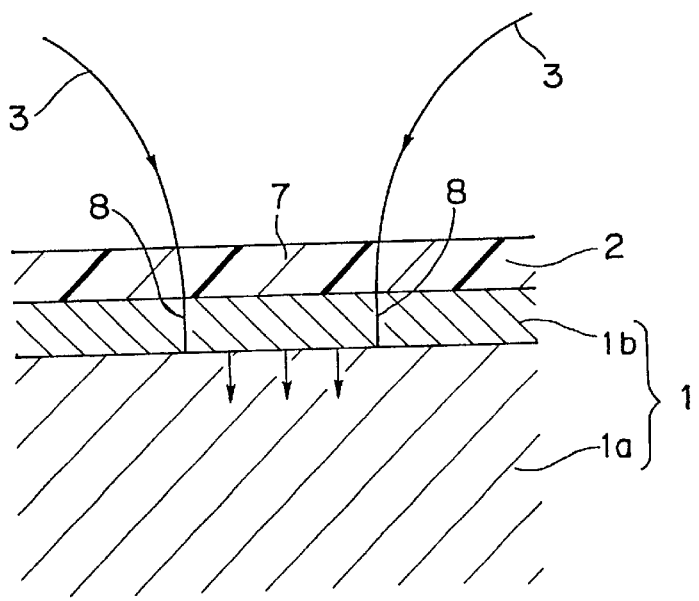
FIG. 9 is a sectional view explanatory of thermal conduction at irradiation of laser beams to a stamper substrate according to a ninth embodiment of the present invention.

In FIG. 4, 40 is a chamber as a process chamber of each kind, 41 is an upper electrode, 42 is a lower electrode, and 43 is a stamper substrate placed on the lower electrode 42 which corresponds to 1 in FIGS. 1A–1F of the above-described embodiments, 1 in FIGS. 6 and 9, 11 in FIGS. 2A–2F, and 21 in FIGS. 3A–3F. 44 is a lower electrode-matching device and 45 is a high frequency power source connected to the lower electrode 42 via the matching device 44. 46 is an exhaust pump for evacuating the chamber 40, 47 is a reaction gas feed pipe for feeding a reaction gas into the chamber 40, and 48 are flow rate regulation valves for regulating a feed flow rate of reaction gases. The reaction gases are three kinds, i.e., a dry development gas, an etching gas, and an ashing gas. Each reaction gas is connected from a feed tank not shown through a pipe 49, 50, 51 and via the flow rate regulation valves 48 to the reaction gas feed piping 47. 52 is an optical fiber for detecting an end point of etching to the stamper substrate in the chamber 40, 53 is an end point detecting device connected to the optical fiber 52, and 54 is a control device for the etching apparatus. An irradiance state of plasma is input to the end point detecting device 53 via the optical fiber 52, so that the end point detecting device 53 automatically monitors the end point of the etching. An emission spectrum of plasma results from radicals and ions of the etching gas, its decomposed product, reaction product, or the like. More specifically, in the etching process of FIG. 3E, when the stamper substrate main body 21a starts to be etched after the base layer 21a as the stamper substrate main body appears in the progress of etching to the dry etching layer 21b, the emission spectrum of plasma changes. The end point detecting device 53 detects the change in emission spectrum and orders the control device 54 to stop the etching. Accordingly, a quantity of etching can be managed by an accuracy of a film thickness of the dry etching layer 21b, because an adhesion amount of the film can generally be more accurately controlled than the quantity of etching.

The foregoing description only discusses a case where the thickness of the dry etching layer 21b is equal to the height of the signal projection 26. However, the present invention is actually effective even if the height of the signal projection 26 is smaller than the thickness of the dry etching layer 21b. As described earlier, the height of the signal projection 26 is $\lambda/(4 \times n)$, approximately 100–150 nm when the wavelength of the playback-use laser beams for playing back the optical disk is $\lambda$ and the index of refraction of the optical disk is n. Therefore, the signal projection 26 can be formed sufficiently if only the dry etching layer 21b has the thickness of 1 $\mu$m. Since a total thickness is 0.3 mm, the stamper exhibits almost the same characteristic as the stamper substrate in mechanical and thermodynamic view points. In other words, a material of an optimum characteristic based on a molding condition can be selected for the stamper substrate. For the dry etching layer 21b, on the other hand, an optimum material can be selected in consideration of an etching characteristic.

In the etching apparatus shown in FIG. 4, not only the etching process is carried out, but the dry development, etching, and ashing can be executed continuously by evacuating by the exhaust pump 46 and opening/closing the valves 48 to feed a desired reaction gas from any one of the pipes 49, 50, 51 into the chamber 40 to replace only the reaction gas to be fed to the chamber 40. Thus, three steps can be executed by one apparatus and new plant and equipment investment can be greatly reduced. Moreover, handling the stamper among the steps is eliminated, thereby preventing generation of defects such as adhesion of foreign particles or the like, with a yield improved greatly and a production time shortened.

The etching in the present invention is not limited to reactive ion etching, and can be sputter etching or ion beam etching.

In each embodiment described hereinabove, the resist used is a mixture of polymethyl isopropenylketone (PMIPK) and a bisazide compound which can be dry-developed. However, the present invention is not restricted to resist and is applicable to any other resists which can be dry-developed, as well as any other dry development methods. An example is a method of silylating exposed parts (changing exposed parts to a silicon compound) thereby increasing a durability to the oxygen plasma and selectively developing the exposed parts. The heating after the exposure is carried out in an ambience of an organic gas such as hexamethyl disilazane (HMDS) or the like by way of example of the silylation. In this case alike, a heating temperature is approximately 130–150° C. The unexposed parts are crosslinked by baking prior to the silylation thereby suppressing diffusion of the HMDS, whereas the HMDS easily diffuses to the exposed parts to silylating the exposed parts. The silylated parts have a high durability to the oxygen plasma, so that the parts can be left as projecting parts for forming signal projections in the dry development afterwards.

For the stamper substrate for forming the stamper or stamper substrate main body designated by the reference numeral 1 in FIGS. 1A–1F, 11 in FIGS. 2A–2F, and 21a in FIGS. 3A–3F, a material essentially consisting of at least one of nickel, chromium, aluminum, cobalt, iron, molybdenum, tungsten, boron, copper, and tantalum, or the like material is utilizable, whereby the stamper substrate or stamper substrate main body can be mass-produced inexpensively. Since the stamper substrate or stamper substrate main body of the aforementioned metal can be easily formed into approximately 0.3 mm, which is a thickness of a nickel stamper used at present (i.e., stamper conventionally manufactured by electroforming), the finished stamper can be directly used for a mold of the molding machine currently used. Most of these metals have a thermal conductivity close to a thermal conductivity of the conventional nickel stamper and can be molded under a molding condition kept equal to the present one. The obtained stamper is, hence, readily replaceable with the currently used stamper.

According to a different embodiment of the present invention, a silicon compound of Si, $SiO_2$, SiC, or the like can be used for the stamper substrate or stamper substrate main body. These are superior in processability by etching and relatively easily available because of a wide usage in the semiconductor field. Since the silicon stamper substrate becomes larger in thickness than the currently used nickel stamper, a spacer should be inserted to the mold to adjust the thickness.

In a still different embodiment, glass can be used for the stamper substrate or stamper substrate main body. Qualtz glass is preferred from a view point of processability by etching.

In a yet different embodiment, a material essentially consisting of carbon is usable for the stamper substrate 1, 11 or stamper substrate main body 21a. Such a material that is obtained by sintering and hardening carbon powder into a sheet, or the like can be utilized.

According to each of the above-described embodiments, the stamper can be completed without forming pits with chemicals in a wet process or cleaning in pure water after applying the photoresist to the stamper substrate 1, 11, 21 to form the resist layer thereto. While the negative type resists for dry development have been long studied in the semiconductor field, switching to the dry process is advantageous in improving the demerit of conventional negative type resists, i.e., a resolution decrease because of swelling through contact with the developing solution.

In the above-described arrangement, when using the resist for dry development, projecting parts for forming signal projections 6, 16, 26 can be formed to the resist layer without carrying out a wet development as in the prior art. According to the process whereby the stamper is manufactured not by electroplating, but by directly etching the stamper substrate 1, 11, 21 as a stamper base to form the pits, the stamper can be manufactured without the conventional electroforming. In the prior art, pits (dents) formed through exposure and development with a positive type resist are duplicated by electroforming, thereby obtaining reversed projections. In the case of using the negative type resist, by contrast, the exposed parts by the laser beams remain after the development, which serve as the mask at the etching. In other words, the part other than the exposed parts is removed by etching, whereby the projections 6, 16, 26 can be directly formed to the stamper substrate 1, 11, 21. Accordingly, the pits can be formed in a vacuum without a wet chemical treatment in each of the foregoing embodiments. Management on cleanness is facilitated, adhesion of foreign particles or the like is reduced and, a process yield is improved.

The above first through fourth embodiments of the present invention exhibit the following effects.

(1) Pits are formed in the chemical liquid, namely, developing solution in the conventional mastering process, thereby being accompanied with difficulties in management on cleanliness and undesirable easy adhesion of foreign particles or the like. According to the present invention, on the other hand, the optical disk stamper can be formed without wetting the stamper substrate with the cleaning solution and the chemical liquid after applying the resist to the stamper substrate and, pits can be formed in a vacuum without a wet chemical process. Accordingly, the cleanliness is managed with ease, adhesion of foreign particles or the like is reduced, and the process yield can be improved. More specifically, since a wet process with pure water, chemicals, or the like is eliminated after the resist is applied to the stamper substrate, generation of surface defects which would result from the adhesion of stain and foreign particles if the stamper substrate were dried subsequent to the wet process is prevented. The stamper of a high quality can be manufactured with a good yield.

(2) A pure water apparatus and a waste disposal apparatus for the wet process are eliminated, thereby greatly reducing new plant and equipment investment.

(3) The present invention is executed in the dry process, not in the wet process, with the number of steps reduced as compared with the prior art. In particular, when the stamper substrate machined to the stamper size and having the resist applied beforehand is used, and at the same time, when the dry development, etching, and resist removal are carried out in the same chamber, the stamper required for molding can be manufactured with only three facilities. Costs for production facilities are consequently reduced and a factory area can be made small.

(4) The stamper can be manufactured in a short time because of the above-described reasons.

(5) The decrease in the number of steps lowers the probability of generation of defects such as adhesion of foreign particles or damage to the stamper substrate during transfer and handling of the stamper substrate, thereby improving the yield.

(6) The stamper substrate with the negative type resist applied is formed of the material essentially consisting of at least one of nickel, chromium, aluminum, titanium, cobalt, iron, molybdenum, tungsten, boron, copper, and tantalum. When the stamper substrate is formed into the same thickness as a nickel plate manufactured by conventional electroforming, a conventional molding machine can be used without changing the mold. If the stamper substrate is formed of a nickel-based alloy, chromium-based alloy, nickel chromium alloy, or nickel cobalt alloy, or is provided with the dry etching layer of titanium nitride, titanium oxide, tantalum, tungsten, chromium, molybdenum, cobalt, boron, nickel phosphor, nickel boron, nickel cobalt, or the like on the above alloy, the molding condition can be kept the same as for the conventional nickel stamper.

(7) In the stamper substrate having the dry etching layer of titanium nitride, titanium oxide, tantalum, tungsten, chromium, molybdenum, nickel phosphor, nickel boron, nickel cobalt, or the like, when a thickness of the dry etching layer is made equal to a desired height of the signal projection, an end point of the etching can be easily detected from a change in emission spectrum of the plasma, whereby an accuracy in etching, namely, a height accuracy of signal pits by the etching can be enhanced.

(8) According to the method and the apparatus of the present invention, no process is included requiring know-how about chemical treatments or the like process, thus enabling manufacturers even without experience to do the mastering.

(9) Nor a step using chemical changes is included, whereby the process is stable.

(10) Costs for maintaining the working environment such as temperatures, humidities, or the like constant are eliminated.

(11) If the inner or outer diameter is machined to the stamper size to fit the mold of the optical disk-molding machine before the resist is formed to the stamper substrate by application or the like manner, the probability of generation of defects in later steps decreases and the yield can be enhanced further.

(12) When the substrate to which the negative type resist is applied is to be formed of a silicon compound of Si, $SiO_2$, SiC, or the like, these metals are superior in etching processability and comparatively easily accessible owing to a wide use in the semiconductor field. In the case where the substrate to which the negative type resist is applied is to be formed of glass, quartz glass is preferred from a view point of etching processability. When the substrate to which the negative type resist is applied is to be formed of a material essentially consisting of carbon, such material as obtained by sintering carbon powder and hardening it into the form of a sheet, or the like can be used.

(Fifth Embodiment)

Each process of a direct dry mastering method according to a fifth embodiment of the present invention, namely, each process of mastering, with which shape distortion of pits of the optical disk can be prevented in consideration of a heat characteristic of the above-described stamper substrate 1 is indicated in FIGS. 1A–1F. Although FIGS. 1A–1F are process diagrams of the direct dry mastering method for the stamper for optical disks according to the first embodiment, the process is fundamentally equal to the direct dry mastering method of the fifth embodiment, and therefore, the direct dry mastering method of the fifth embodiment will be discussed with reference to FIGS. 1A–1F.

FIG. 1A shows a state in which the negative type resist for dry development is applied to the front face of the stamper substrate 1, thereby forming the resist layer 2.

As shown in FIG. 1B, signals are recorded by the laser beam recorder to the stamper substrate 1 of FIG. 1A. Although the laser beam recorder is illustrated only partly in the drawing, the laser beam recorder has an optical system 100 for irradiating laser beams 3 via the recording lens 4 while modulating the laser beams with a desired signal, thereby irradiating along the radial direction of the stamper substrate 1, and the rotary driving apparatus 101 for rotating the stamper substrate 1 with a desired number of revolutions. The optical system 100 is equipped with the recording lens 4 for converging the signal-modulated laser beams 3 to a size of sub microns and irradiating the converged laser beams 3 to the resist layer 2 on the rotating stamper substrate 1. The signals are recorded to the resist layer 2 on the stamper substrate 1 by irradiating the laser beams 3 via the recording lens 4 to the resist layer 2 on the stamper substrate 1 while the stamper substrate 1 is rotated by the rotary driving apparatus 101 with the desired number of revolutions.

Then, the resist layer 2 on the irradiated stamper substrate 1 is heated by an oven or the like and annealed.

Then, FIG. 1C shows the stamper substrate 1 after the heat treatment is finished. The heating is carried out after the irradiation of the laser beams in the case of a chemical amplification type resist, a resist which can be dry-developed, for instance, a bisazide compound blended with polymethyl isopropenylketone (PMIPM), or a dry development resist which is silylated in an organic gas ambience such as HMDS or the like after the irradiation of the laser beams. Some kinds of resists do not need the heating after the irradiation of the laser beams. In such a case, the heating process is eliminated.

Then, development by the developing solution is carried out after the heat treatment. FIG. 1D shows the stamper substrate 1 after the development. Unexposed parts of the stamper substrate 1 are removed by the development, and only exposed parts by the laser beams 3 remain as projecting parts 5 for forming signal projections on the stamper substrate 1.

Then, with the projecting parts 5 used as a mask for forming the signal projections, dry etching is executed to the stamper substrate 1.

FIG. 1E shows the stamper substrate 1 after the dry etching. 5A is a projecting part for forming the signal projection after the dry etching of the projecting part 5 for forming the signal projection. 6 is the signal projection formed under the projecting part 5A to the stamper substrate 1. An optimum gas to be used for the dry etching is selected in accordance with the stamper substrate 1, and generally $CF_4$, $NF_3$, $BCl_3$—$Cl_3$, $Cl_3$, $CCl_4$, or the like is used.

Then, FIG. 1F indicates a state after the projecting parts 5A constituted of the resist and passed through the dry etching are removed by ashing. A so-called master stamper is completed. The ashing is a process of decomposing the resist constituting the projecting parts 5A on the signal projections 6 of the stamper substrate 1 to $CO_2$ and $H_2O$ by oxygen radicals of the oxygen plasma.

Thereafter, inner and outer diameters of the stamper substrate 1 are machined so that the stamper substrate 1 can be set to the mold of the molding machine. The stamper substrate 1 is now finished as the master stamper.

In the above method, the number of steps can be reduced without a process of forming a metallic stamper through transferring of the glass substrate by electroforming, and deterioration in quality and yield due to defects generated in the process can be prevented. The stamper can be manufactured not only with the quality improved, but in a reduced number of steps. The reduction in number of steps can improve the yield as a whole and productivity.

In the case where the stamper substrate is processed through the above-described steps and then directly used as the stamper, the stamper substrate should be formed of a material resistible to a thermal stress and an injection pressure applied from a high-temperature resin in the molding machine.

In relation to this, the published U.S. Pat. No. 5,503,963 (Process for manufacturing optical data storage disk stamper) describes that a ceramic having a fracture toughness of not smaller than 2 MPa$\sqrt{m}$ (MPa represents the unit of mega pascal and m is the unit of meter of length) is preferable for the substrate to be molded. General glass, resin, silicon, or the like has a fracture toughness of not larger than 2 MPa$\sqrt{m}$. On the other hand, the published U.S. Pat. No. 5,783,371 (Process for manufacturing optical data storage disk stamper) describes that an amorphous metal having 10 MPa$\sqrt{m}$ or larger fracture toughness is good for the substrate to be molded.

However, most pure metals have a fracture toughness exceeding 100 MPa$\sqrt{m}$ and, 100 MPa$\sqrt{m}$ is much larger than the above values. Therefore, what is rather more important than the fracture toughness for properties required of the stamper substrate is dry etching processability, thermal behavior at the irradiation of laser beams, and the like. The dry etching processability is determined by a relationship to the kind of the reaction gas and a resistance to etching of the resist and, cannot be argued simply from a view point of the substrate material.

Meanwhile, the laser beam irradiation is a process for forming the projecting parts 5 of the resist which serves as a mask at the dry etching. The process is considerably important as well as the succeeding development. In the case of a negative type resist, parts irradiated by the laser beams 3 among the stamper substrate 1 are left as the projecting parts 5 for forming signal projections on the stamper substrate 1 after the development. A state in which the resist is exposed with to the laser beams 3 is crucial. While a standard thickness of the stamper substrate 1 to be used as the stamper is 0.3 mm, a thickness of the resist layer 2 is in the range of about 0.05–0.2 µm.

Besides, a spot diameter of the irradiating laser beams 3 is approximately 0.3 µm in a DVD. The exposed parts of the resist layer 2 are shaped into a flat plate having a thickness smaller than a breadth. The laser beams 3 can reach the stamper substrate 1 while being hardly absorbed by the resist layer 2 if the laser beams 3 have a wavelength appropriate for recording. A part of the resist where the laser beams 3 penetrate generates a photochemical reaction. The laser beams 3 reaching the stamper substrate 1 raises a temperature of the stamper substrate 1. According to calculations, the temperature of the stamper substrate 1 is estimated to instantaneously rise to exceed several hundreds ° C. and exceed a glass transition point (approximately 100° C.) of the resist constituting the resist layer 2. If the material of the stamper substrate 1 has its temperature raised easily subsequent to the irradiation by the laser beams 3 and it is hard to release the heat, the resist layer 2 is estimated to be softened and deformed due to the heat stored in the stamper substrate. Also, the resist layer is possibly changed in quality due to the heat. The quality change changes a development characteristic and eventually changes the shape of the projecting parts 5A of the resist after the development. The heat accelerates a part where a light energy which brings about bridging through the photochemical reaction is not larger than a threshold and which is not fully crosslinked, causing a phenomenon of substantially expanding or spreading the exposed parts.

Figure 8:
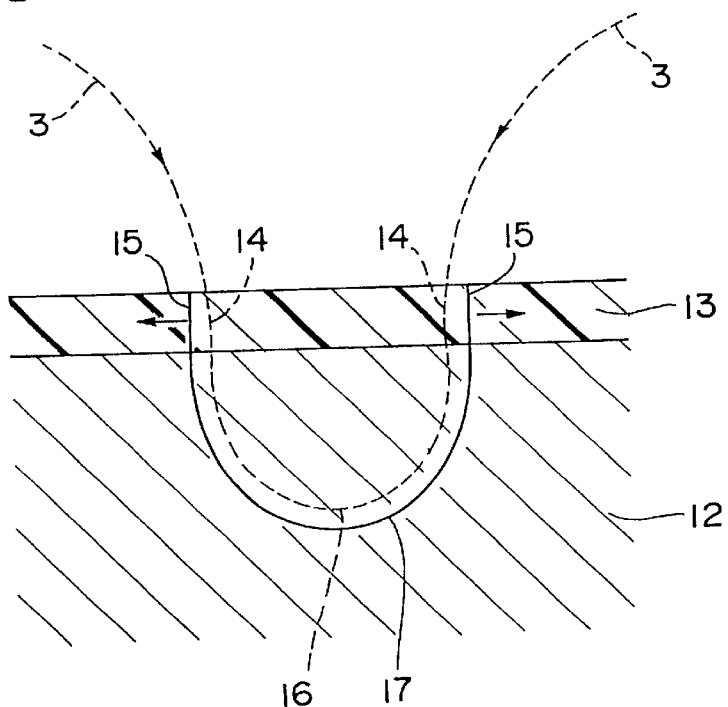
FIG. 8 is an explanatory diagram of thermal reaction at irradiation of laser beams by a conventional stamper substrate.

The phenomenon will be more fully described with reference to FIG. 8. 112 is a stamper substrate, 113 is a resist layer applied on the stamper substrate 112, and 3 is a laser beam irradiated onto the resist layer 113. An area surrounded by a line 114 of the resist layer 113 is a pair exposed by the laser beams 3. When the resist layer 113 is constituted of a negative type resist, unexposed parts not irradiated by the laser beams 3 are removed by the development and parts photosensitized by the irradiation of the laser beams 3 are left on the substrate 112. At the irradiation of laser beams 3, the laser beams 3 are absorbed by the stamper substrate 112, so that an area surrounded by a dotted line 116 is heated to a high temperature. This heat of the stamper substrate 112 is transmitted to the resist layer 113 and adversely influences the resist layer 113. If the heat stored in the area of the dotted line 116 is gradually spread to a range of a solid line 117, a corresponding part of the resist layer 113 is also exposed to the high temperature. In consequence, deformation and quality change or bridging because of heat is brought about in a range of a solid line 115 of the resist layer 113. The part surrounded by the solid line 115 is deformed or left as projections after the development. A shape accuracy of projections after the development is eventually deteriorated, thereby distorting the shape of projections of the stamper, and finally, the shape of pits of the molded optical disk.

As such, the fifth embodiment of the present invention provides a stamper by direct mastering, a method for direct dry mastering the stamper, and optical disks formed by the stamper, by eliminating the above-discussed problems in consideration of the heat characteristic of the stamper substrate 1.

Specifically, the material for the stamper substrate I to be the stamper is selected so that a value of (ρ×c) is larger than a value of (ρ×c) of glass wherein ρ is a density of the material and c is a specific heat. The value of the (ρ×c) is a calory necessary for raising the material of a unit volume by 1° C., which dimension is expressed in the unit of [kcal/m³·deg], i.e., [4.2 kJ/m³·deg], in the SI unit system. A part showing a large value of the (ρ×c) is hard to raise the temperature of the part when absorbing a calory. The stamper substrate 1 of the fifth embodiment has the value of the (ρ×c) set to be larger than the value of the (ρ×c) of glass. In other words, the stamper substrate 1 of the fifth embodiment shows a smaller temperature rise than the temperature rise of the conventional glass substrate which is formed by mastering after applying a photoresist and being irradiated by laser beams. That is, the resist layer 2 can be less influenced by heat than in the conventional method.

This will be detailed with reference to FIG. 6.

As shown in FIG. 6, the resist is applied onto the stamper substrate 1, whereby the resist layer 2 is formed. The resist layer 2 is constituted of a resist exerting a negative type action. A positive type resist may be used only if it acts with the negative type action through an image reversal method or the like after the irradiation of the laser beams.

When the laser beams 3 are irradiated to the resist layer 2, a part 7 of the resist layer 2 is exposed to the laser beams. The exposed part remains as the mask for forming signal projections after the development. The laser beams 3 are hardly absorbed by the resist layer 2 and reach the stamper substrate 1. Although the laser beams are partly reflected at the surface of the stamper substrate 1, the remainder is absorbed, thermally affecting a part surrounded by a solid line 8. The material of the stamper substrate I has a large density ρ and a large specific heat c, and therefore has a larger product (ρ×c) than glass. The temperature rise by the heat of the laser beams 3 is, hence, reduced more than in the case of glass. Glass has the (ρ×c) value of 2268 kJ/m³·deg (=540 kcal/m³·deg). Ag, Au, Cu, Al, W, Mo, ZN, Ni, Ta, Cr, or the like has a larger (ρ×c) than the above value. Accordingly, the temperature rise of the part surrounded by the solid line 8 of the stamper substrate 1 in the fifth embodiment of the present invention is smaller than in the glass substrate and hardly influences the resist layer. Ta or W is selected because they are easy to etch.

In the conventional mastering process, influences by the stored heat to exposed parts of the glass substrate raise new issues to be tackled as signals become smaller. However, in the case where the (ρ×c) value is larger than that of glass, deformation and quality change by the heat to the exposed parts and spread (overflow) of the exposed parts can be regarded as negligible.

According to the fifth embodiment, since the (ρ×c) value which is a product of the density p and the specific heat c of the material of the stamper substrate 1 is set larger than the value of glass, the temperature rise due to the heat of the laser beams 3 is reduced as compared to the case of glass, while hardly influencing the resist layer. The resist layer 2 can thus be prevented from being deformed or changed in quality and at the same time, and bridging at the resist layer 2 is prevented from being promoted by the heat, so that the spread of the photo-responsive pairs is substantially eliminated.

(Sixth Embodiment)

A stamper substrate 1 used in direct dry mastering according to a sixth embodiment of the present invention is constituted of a material of a larger thermal diffusivity than a thermal diffusivity of glass.

Explanation is carried out referring to FIG. 6. Although the heat is diffused from the stamper substrate 1 of the range surrounded by the solid line 8 which is influenced by the heat of the laser beams 3, a ratio of the heat diffused is larger than in glass because the thermal diffusivity of the stamper substrate is larger than the thermal diffusivity of glass. The heat is accordingly promptly diffused and hard to transmit to the resist side, with no influences given to the resist layer 2 such as deformation, quality change, or the like described above. Thermal bridging is prevented from being prompted or the like. Since the thermal diffusivity of glass is 0.0012 m²/h and most metals have larger thermal diffusivities than glass, most metals can be used for the stamper substrate. Supposing that the thermal diffusivity is expressed by a[m²/h] and a thermal conductivity is λ[kJ/m·h·deg], a=λ/(ρ×c) is held. The thermal diffusivity represents a ratio of calory emitted for a unit time when a unit volume receives a quantity of heat. The larger the thermal diffusivity, the quicker the heat is diffused and not stored. Since the stamper substrate 1 of the sixth embodiment of the present invention has the thermal diffusivity larger than glass, the stamper substrate stores less heat than by the conventional mastering using glass, while lessening the influences to the resist layer.

In the above sixth embodiment, the thermal diffusivity of the material of the stamper substrate 1 is set larger than the value of the thermal diffusivity of glass, whereby the temperature rise by the heat of the laser beams 3 is reduced in comparison with the case of glass and the resist layer is hardly influenced. The resist layer 2 can be consequently prevented from being deformed or changed in quality, and at the same time, bridging by the heat is prevented from proceeding at the resist layer 2 to substantially expand the photo-responsive parts.

(Seventh Embodiment)

A stamper by a direct dry mastering according to a seventh embodiment of the present invention uses a stamper substrate 1 which is a combination of the fifth embodiment and the sixth embodiment and is constituted of a material having a larger (ρ×c) value and a larger thermal diffusivity than the (ρ×c) value and the thermal diffusivity of glass.

In the seventh embodiment, the material of the stamper substrate 1 is larger than glass both in (ρ×c) value and thermal diffusivity. In this stamper substrate 1, the temperature rise of the stamper substrate itself subsequent to the irradiation of the laser beams 3 is small, and the calory absorbed by the stamper substrate 1 is diffused speedily, thereby further reducing influences of the heat to the resist. Concretely, the (ρ×c) value of the stamper substrate according to the seventh embodiment is larger than 2268kJ/m³·deg (=540 kcal/m³·deg) which is the (ρ×c) value of glass and the thermal diffusivity is larger than 0.0012 m²/h which is the thermal diffusivity of glass.

The seventh embodiment accordingly exerts the actions and the effects of the foregoing fifth and sixth embodiments.

(Eighth Embodiment)

A stamper manufactured by a direct dry mastering according to an eighth embodiment of the present invention has a stamper substrate 1 constituted of a material of the thermal diffusivity of not smaller than 0.01 m²/h. The thermal diffusivity is preferably set to be not smaller than 0.01 m²h if a higher accuracy is required although the thermal diffusivity larger than 0.0012 m²/h which is the thermal diffusivity of glass is sufficiently effective to reduce influences of the heat to the resist layer as described in the sixth embodiment. For example, the heat of the laser beams 3 absorbed by the stamper substrate 1 influences the pits formed to the stamper substrate 1 by approximately 10–20 nm, namely, approximately 5% of a pit width when the pit width is 300 nm. Empirically, the thermal diffusivity should be 0.01 m²/h or larger to restrict the influence to approximately 1% of the pit width.

An example of the material is 18-8 stainless having the thermal diffusivity of 0.0 143 m²/h, and can also be selected from Ag, Au, Cu, Al, W, Mo, Zn, Ni, Ta, Cr, or the like metal. Each of these metals has the thermal diffusivity larger by several times-ten times than 0.0143 m²/h which is the thermal diffusivity of the 18-8 stainless.

According to this eighth embodiment, the stamper substrate 1 is formed of the material of the thermal diffusivity of not smaller than 0.01 m²/h, whereby the stamper necessary if pits of a higher accuracy than in the first through seventh embodiments are to be formed to the optical disk can be manufactured.

The present invention is not limited to the above first-eighth embodiments and can be embodied in other various modes.

Figure 7:
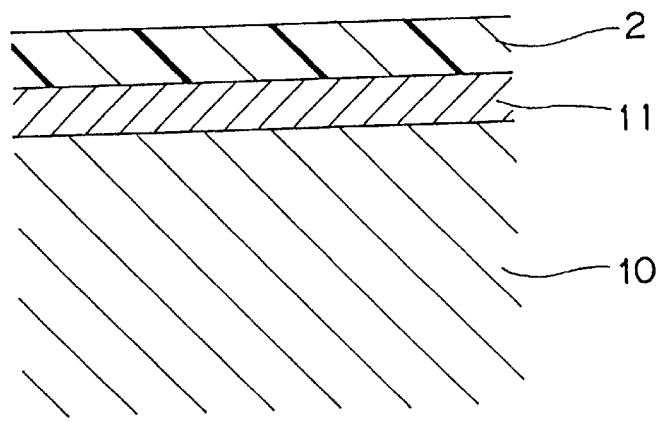
FIG. 7 is a sectional view explanatory of a stamper substrate in a modified example of the fifth embodiment.

By way of example, the stamper substrate 1 is not limited to a single layer, but may be a double layer structure as shown in FIG. 7 similar to FIG. 3A. A stamper substrate 110 may be constituted of double layers of an Ni base substrate 110a as a first layer and a dry etching layer 110b to be dry-etched as a second layer formed of, e.g., W or Ta in a thickness of about 0.1 μm on the base substrate 110*a*. In FIG. 7, 2 is the resist similar to FIG. 1A. The dry etching layer 110*b* is formed on the base substrate 110*a* by sputtering or the like method. As indicated in FIG. 1E, when signal projections 6 are formed after the dry etching, the height of the signal projections 6 corresponds to the thickness of the dry etching layer 110*b*. The reason why the stamper substrate is formed in the double layer structure is that a material appropriate for the dry etching can be provided, not to the whole stamper substrate, but only to the dry etching layer 110*b* which is part of the whole stamper substrate and, only the dry etching layer 110*b* is removed by dry-etching at the time of dry etching, so that an end point of the dry etching is judged by detecting when the base substrate 110*a* is exposed, that is, the end point of the dry etching can be detected easily.

In the fifth embodiment of FIGS. 1A–1F, the stamper substrate is machined to the stamper size after signal projections or the like projections and dents are formed thereto by dry etching and ashing. However, the stamper substrate may be machined to the stamper size before the resist is applied to the stamper substrate. Alternatively, only the outer diameter of the stamper substrate is machined to the stamper size beforehand and, the inner diameter of the stamper substrate is machined to the stamper size based on the center of tracks after the signal projections are formed by the dry etching. In this case, registration is more correctly carried out.

(Ninth Embodiment)

As a modification of the first-eighth embodiments, in the case where the stamper substrate 1 is not limited to a single layer and formed in the double layer structure as in FIG. 7, influences by the stored heat of the stamper substrate at the irradiation of laser beams can be reduced by more properly selecting a material of the double layers, which will be described below.

In FIG. 10, 110 is the stamper substrate which is constituted of a base layer 110*a* and an etching layer 110*b*. A thickness of the etching layer 110*b* is made equal to the height of signal projections 6 left after the etching. The stamper substrate 110 is formed in the double layer structure because an etching depth is equal to the etching layer 110*b*, thereby facilitating detecting an end point of the etching. Moreover, a material for the etching layer 110*b* can be set to one having good etching properties, and an optimum material can be selected for the base layer 110*a* from view points of thermophysical properties and mechanical strength characteristic. In FIG. 10, 2 is the resist layer applied on the etching layer 110*b* of the stamper substrate 110 and 3 is the laser beam irradiated to the resist layer 2. The laser beams 3 are hardly absorbed by the resist layer 2 and reach the stamper substrate 110. When the laser beams 3 reach the stamper substrate 110, the laser beams are partly reflected and the remainder is absorbed by the stamper substrate 110. At this time, an area of the resist layer 2 surrounded by a line 121 is exposed by the laser beams 3. If the resist layer 2 is formed of a negative resist, unexposed parts not irradiated by the laser beams 3 are removed by the development and the part exposed through the irradiation of the laser beams 3 remains on the stamper substrate 110. At the irradiation of the laser beams 3, the laser beams 3 are absorbed by the stamper substrate 110 and an area of the etching layer 110*b* surrounded by a line 122 is heated to a high temperature. The heat is transmitted to influence the resist layer 2, whereby the part designated by the solid line 121 is deformed and changed in quality or crosslinked by the heat. If the heat stored in the area of the line 122 of the etching layer 110*b* gradually spreads, the corresponding resist layer 2 is exposed to the high temperature and the crosslinked part surrounded by the solid line 121 spreads similarly. Although the projecting part 5 for forming a signal projection which remains after the development is the part surrounded by the solid line 121, the deformed part alike remains as the projecting part. In consequence of this, the projecting part 5 becomes larger in shape than the irradiated part by the laser beams. A shape of the projecting part 5 after the development is eventually deformed. The signal projections of the stamper, actually, pits of the optical disk after being molded are distorted in shape in the end, which changes how playback-use laser beams are reflected, thereby changing play-back signals.

The above phenomenon will be concretely depicted with reference to FIGS. 11A–11C.

FIGS. 11A–11C show a signal pit 160 formed to the optical disk after molding, in which $L_1$ is a length of an opening part of the pit 160, $L_2$ is a length of a bottom part of the pit 160, $W_1$ is a breadth of the opening part of the pit 160, $W_2$ is a breadth of the bottom part of the pit 160, d is a depth of the pit 160, $\theta_1$, is a tilt angle in a forward-backward direction of the pit 160, and $\theta_2$ is a tilt angle of a side wall of the pit 160. The pits 160 spirally continue in the actual optical disk. When a spot of the playback-use laser beams converged to sub microns is irradiated to the pit 160, the reflecting light is modulated by diffraction and interference by the pit 160, which is detected as a signal. Therefore, a characteristic of the playback signal is greatly influenced by a shape of the pit. When the pit shape changes, the playback signal is distorted and not played back properly. The signal itself cannot be detected if a pit end deviates over an allowance in a direction of time axis. As such, the signal projections of the stamper must be formed in a shape so that the playback can be performed in an optimum manner. A factory for producing optical disks should be managed so that the signal projections of the stamper are formed without variations in shape and maintained in an optimum shape at all times.

The ninth embodiment of the present invention provides a stamper by a direct mastering and optical disks whereby the above-discussed problems are eliminated with the heat characteristic of the stamper substrate 1 taken into consideration.

A stamper substrate 1 by the direct mastering according to the ninth embodiment is shown in FIG. 9.

The stamper substrate 1 includes a base layer la and, an etching layer 1*b* arranged on the base layer 1*a* with having the resist layer 2 provided to a front face thereof A material is so selected that a thermal conductivity of the base layer 1*a* is larger than a thermal conductivity of the etching layer 1*b*. The heat absorbed by the etching layer 1*b* is absorbed by the base layer 1*a* disposed in contact with the etching layer 1*b* below the etching layer 1*b* rather than diffused laterally. This heat sink operation protects the etching layer 1*b* and the resist layer 2 on the etching layer 1*b* from high temperatures.

A thickness of the etching layer 1*b* is set equal to the height of the signal projections 6 to be left by the etching. A resist is applied onto the etching layer 1*b*, thereby forming the resist layer 2. The resist layer 2 is constituted of the resist acting with the negative type action. In place of the resist acting with a negative type action, a positive type resist can be employed if the resin shows the negative type action by an image reversal method or the like after irradiating the laser beam. A part 7 of the resist layer 2 is exposed to the laser beams 3 when the laser beams 3 are irradiated. The exposed part remains after the development. The laser beams 3 reach the etching layer 1b while being hardly absorbed by the resist layer 2. While the laser beams are partly reflected by a front face of the etching layer 1b, the remainder is absorbed, heating a part surrounded by a solid line 8 first. In order to reduce influences by the heat to the resist layer 2 as much as possible, materials of high thermal diffusivities are selected both for the etching layer 1b and for the base layer 1b. The materials selected are in a combination to make the thermal conductivity of the base layer 1a larger than the thermal conductivity of the etching layer 1b. The heat of the part surrounded by the line 8 of the etching layer 1b is absorbed quickly by the base layer 1a as diagrammatically shown by down arrows in FIG. 9. Therefore, the exposed part 7 of the resist layer 2 is less deformed or expanded than in FIG. 10. Also, the resist layer 2 is not changed in quality. Since dissolution or etching properties at the development are thus prevented from changing, the projecting parts 5 can be shaped accurately, enabling accurate processing for the signal projections 6 which are formed with the projecting parts 5 being used as a mask.

A concrete example of the stamper substrate 1 is constituted of the base layer 1a of nickel and etching layer 1b of tantalum. The nickel has the thermal conductivity of 332.64 kJ/m·h·deg (79.2 kcal/m·h·deg.) (20° C.) and the tantalum has the thermal conductivity of 196.56 kJ/m·h·deg. (46.8 kcal/m·h·deg.) (20° C.).

Another concrete example of the stamper substrate 1 is constituted of the base layer 1a of aluminum or copper and the etching layer 1b of tungsten or molybdenum. Aluminum has the thermal conductivity of 827.4 kJ/m·h·deg. (197 kcal/m·h·deg.) (20° C.) and copper has the thermal conductivity of 1420.86 kJ/m·h·deg. (338.3 kcal/m·h·deg.) (20° C.). Tungsten has the thermal conductivity of 600.6 kJ/m·h·deg. (143 kcal/m·h·deg.) (20° C.) and molybdenum has the thermal conductivity of 512.4 kJ/m·h·deg. (122 kcal/m·h·deg.) (20° C.).

According to the ninth embodiment as above, the stamper substrate 1 has the base layer 1a and the etching layer 1b which is arranged on the base layer 1a and has the resist layer 2 formed to the front face thereof, and the base layer 1a is made larger in thermal conductivity than the etching layer 1b. The heat of the etching layer 1b is quickly absorbed by the base layer 1a at the irradiation of laser beams 3. As a result, since the heat received by the resist layer 2 from the stored heat of the stamper substrate 1 at the irradiation of the laser beams is lessened as much as possible, the resist layer 2 can be prevented from being deformed or changed in quality. Crosslinking reaction due to the heat at the resist layer 2 is avoidable. In other words, the exposed part 7 of the resist layer 2 can be prevented from being deformed, expanded, or changed in quality, thereby eliminating a change in dissolution or etching properties at the development.

The present invention is not restricted to the aforementioned ninth embodiment and can be executed in various other forms.

For example, while the stamper substrate is processed to the stamper size after the signal projections or the like projections and dents are formed to the stamper substrate by dry-etching and ashing in the ninth embodiment, the stamper substrate may be processed to the stamper size before the laser beams are irradiated thereto, e.g., before the resist is applied. Or only the outer diameter of the stamper substrate may be preliminarily processed to the stamper size, and then the inner diameter of the stamper substrate may be processed to the stamper size based on the center of tracks after the signal projections are formed by dry etching. Registration of the center can be more correctly conducted in this case. The advantage is that no facility for processing the stamper substrate in processes afterwards is necessary if the stamper substrate processed to the stamper size beforehand and with the resist applied is prepared. That is, the stamper substrate can be prepared at one place. The need for equipping manufacturers with extra facilities is eliminated if the stamper substrate is to be sold in such state as above.

The operations and effects described below are exerted in the above fifth-eighth embodiments of the present invention.

The stamper substrate for forming the stamper by the direct dry mastering according to the present invention is constituted of the material having the larger ($\rho \times c$) value than glass or the larger thermal diffusivity than glass where $\rho$ is density and c is specific heat. The heat of the laser beams when the laser beams are irradiated is more rapidly diffused into the stamper substrate as compared with glass, and is hard to transmit to the resist side. Accordingly, the resist layer is prevented from being deformed or changed in quality by the heat of the stamper substrate stored due to the absorption of the laser beams, and an accuracy for processing projecting parts of the resist for forming signal projections by the development is prevented from changing. Moreover, the resist can be prevented from being widely crosslinked by the heat from the stamper substrate at other parts than the irradiated part by the laser beams, whereby the projecting parts can be prevented from expanding. Because of the above reasons, a size accuracy of the projecting parts constituted of the resist after the development is not deteriorated, with the exposed part correctly left after the development. Pits of the optical disk molded by the stamper of the present invention correctly realize a size as intended at the irradiation, thus not deteriorating characteristics of playback signals. Also by the same reasons, the yield can be improved and the productivity can be enhanced.

The ninth embodiment of the present invention has effects as described hereinbelow.

The stamper substrate according to the present invention includes the base layer and the etching layer disposed on the base layer with the resist layer formed to the front face thereof, in which the thermal conductivity of the base layer is set higher than the thermal conductivity of the etching layer. Then, the heat generated because of absorbing the laser beams at the laser beam irradiation time at the etching layer can be absorbed by the base layer functioning as a heat sink. The resist layer is accordingly prevented from being deformed or changed in quality. The accuracy for processing the projecting parts of the resist by the development is not changed. At the same time, the resist is prevented from being increasingly crosslinked by the heat of the stamper substrate at the other parts than the irradiated part by the laser beams to expand the projecting parts. By the above reasons, the size accuracy of the projecting parts of the resist after the development is not deteriorated and, the exposed part can be left correctly after the development. Pits of the optical disk molded by the stamper of the present invention can correctly realize a size as intended at the irradiation, so that the playback signals are prevented from being deteriorated in characteristic or prevented from being missed. The yield can be improved and the productivity can be enhanced by the same reasons.

(10TH Embodiment)

A direct mastering method for a stamper for optical disks according to a 10th embodiment of the present invention is executed fundamentally in the same process as in the first embodiment of FIGS. 1A–1F. The embodiment can prevent deterioration in playback characteristic of the optical disk caused by a difference in shape between the projecting parts 5 of the resist for forming signal projections and the signal projections 6 of the stamper substrate 1. Although the 10th embodiment is applicable to the direct mastering method for the stamper for optical disks in the second and third embodiments, the following description is based on the direct mastering method for the stamper for optical disks of the first embodiment for the sake of simplification.

In the direct mastering method shown in FIGS. 1A–1F, projecting parts 5 of the resist for forming signal projections are formed by exposure and development. The stamper substrate 1 is etched with the projecting parts 5 being used as a mask, whereby signal projections 6 are formed. At this time, the projecting parts 5 of the resist and the signal projections 6 of the stamper substrate 1 are sometimes different in shape, which deteriorates playback characteristics of the optical disk.

FIGS. 11A–C show a signal pit 160 formed in the optical disk after molded with use of the above stamper. In FIG. 6, $L_1$ is the length of the opening part of the pit 160, $L_2$ is the length of the bottom part of the pit 160, $W_1$ is the breadth of the opening part of the pit 160, $W_2$ is the breadth of the bottom part of the pit 160, d is the depth of the pit 160, $\theta_1$ is the tilt angle in the front-rear direction of the pit 160 to an up-down direction, and $\theta_2$ is the tilt angle in the up-down direction of the side wall of the pit 160. The actual optical disk has the pits 160 continuing spirally. When a spot of playback-use laser beams converged to sub microns is irradiated to the pit 160, the reflecting light is modulated through diffraction and interference by the pit 160 and detected as a playback signal. Therefore, a characteristic of the playback signal is greatly dependent on a shape of the pit 160, in other words, signal projections 6 of the stamper should be processed to a shape with which the playback characteristic becomes optimum. An optical disk production factory should be managed to produce the stamper without any variation in shape of the signal projections 6 of the stamper, i.e., to maintain the signal projections 6 of the stamper in an optimum shape at all times.

Figure 12A:
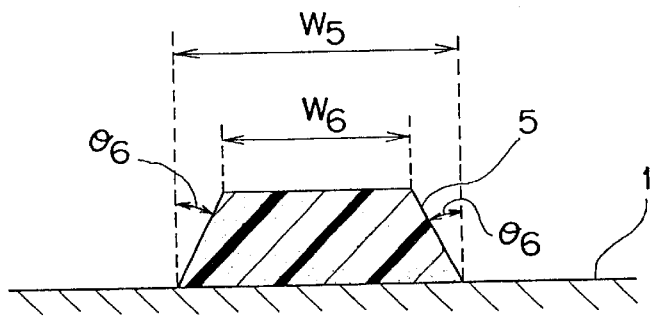
FIGS. 12A and 12B are sectional views each explanatory of a size relationship in a track direction of the optical disk between a projecting part of a resist for forming a signal projection and the signal projection of the stamper substrate.
Figure 12B:
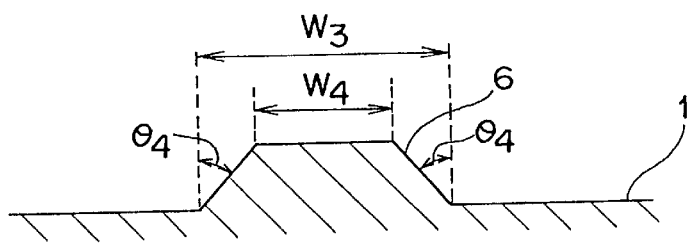

FIG. 12A is a sectional view of the projecting part 5 of the resist formed on the stamper substrate 1 seen from a track direction of the optical disk. FIG. 12B is a sectional view of the signal projection 6 formed on the stamper substrate 1 after the etching, which is illustrated much closer to an actual shape. Although the projecting part 5 is indicated in a square section for the sake of convenience in FIGS. 1A–3F, practically, the projecting part is schematically an isogonal trapezoid. When the stamper substrate 1 is etched in a dry method such as reactive ion etching, ion beam etching, or the like method with the projecting parts 5 of the resist used as a mask for forming signal projections, end parts of the projecting parts 5 functioning as the mask are also cut, and consequently the signal projections 6 formed to the stamper substrate 1 become smaller in size than the projecting parts 5 of the resist.

Supposing that a breadth of an upper face part of the projecting part 5 of the resist is $W_6$, a breadth of a bottom part of the projecting part 5 is $W_5$, and a tilt angle of a side wall of the projecting part 5 is $\theta_6$ as represented in FIG. 12A, and a breadth of an upper face part of the signal projection 6 after the etching and ashing is $W_4$, a breadth of a bottom part of the signal projection 6 is $W_3$, and a tilt angle of a side wall of the signal projection 6 is $\theta_4$ as shown in FIG. 12B, generally, $W_5 \geq W_3$, $W_6 \geq W_4$, and $\theta_6 \leq \theta_4$ are held. Since the signal projections 6 are not perfectly transferred from a molding resin when the optical disk is molded, the tilt angle of the pit 160 of the optical disk further increases. In general, the tilt angle $\theta_2$ of the side wall of the pit 160 to the up-down direction of FIG. 6 and the tilt angle $\theta_4$ of the side wall of the signal projection 6 tend to hold a relationship $\theta_4 \leq \theta_2$.

As above, in the direct mastering method in the dry process, the shape of the pits 160 of the optical disk which directly influences the signal characteristic is not equal to the shape of the projecting parts 5 of the resist, thereby causing deterioration in yield in the production process of the stamper and optical disk.

The difference in shape between the projecting parts 5 of the resist and the pits 160 of the optical disk results from retreat (reduction) of the end parts of the projecting parts of the resist mask at the etching and transfer failure at the time of molding the optical disk. The difference therebetween can be managed within a constant value if an etching resistance of the resist, a dry etching process condition, and a molding condition are managed to be constant at all times.

On the other hand, the shape of the projecting parts 5 of the resist is determined by a sensitivity of the resist, a beam shape (beam profile) of the recording laser beams, a recording signal, and a development condition. Among the factors, what can be easily finely adjusted is the beam shape (beam profile, i.e., an intensity of the laser beams, a diameter of incident beams to the recording lens, or the like) and a recording time (a duty of the recording signal or the like).

In the 10th embodiment of the present invention, after the beam shape of the recording laser beams and the recording signal are set to take a known size difference into account beforehand, the projecting parts 5 of the resist are formed, so that the pits formed finally to the molded optical disk become ideal in shape.

Particularly, the process in which the resist is developed in a dry state is easy to manage to control a quality in the development constant, and therefore, appropriate to apply to the 10th embodiment of the present invention because a time management accuracy is improved in the dry development which requires 1–2 minutes while a time for completing the development in the conventional wet method is as short as 20–30 seconds. However, the 10th embodiment is naturally applicable to the wet development process as well.

Supposing that the signal projection 6 on the stamper substrate 1 shown in FIG. 12B conforms in shape to the ideal pit 160 of the molded optical disk, the projecting part 5 in FIG. 12A should be formed to have the bottom part of the breadth $W_5$ and the upper face part of the breadth W6 both larger than that in the signal projection 6 and the side wall of the tilt angle $\theta_6$ smaller than that in the signal projection 6 in consideration of an amount of the retreat (reduction) of the end part of the projecting part 5 by the etching.

FIGS. 14A and 14B show a relationship of the beam intensity profile of the recording laser beams and the projecting part 5 of the resist formed after the exposure (laser beam irradiation) and the development. In FIG. 14A, $P_0$ is a threshold of an exposure intensity where the resist is started to be obstructed from dissolving in the development process and $P_1$ is an intensity of the beams when a thickness of the resist layer of the resist constituting the projecting parts 5 is $d_0$. It is supposed that when a spot of the recording laser beams with the beam profile of a solid line 210 is irradiated to the resist layer 2, a shape of the projecting parts 5 of the resist remaining at the resist layer 2 after the development is such as shown in FIG. 14B. In this case, an intersection between the beam intensity $P_1$ and the solid line 210 determines a position of the upper face part of the projecting part 5 and, an intersection between the threshold $P_0$ of the irradiation intensity and the solid line 210 determines a position of the bottom part of the projecting part 5. 211 in FIG. 14A shows the beam profile when the laser beam intensity is decreased. 212 in FIG. 14A is the profile when a numerical aperture N.A. of the recording lens for converging the recording laser beams or the diameter of the incident beam to the recording lens is reduced. As is clear from the drawing, when the intensity of the recording laser beams, numerical aperture of the recording lens, and the diameter of the incident beam are changed, the beam profile is changed and intersections between the beam profile and the $P_0$, $P_1$ are respectively changed. The shape of the projecting parts 5 corresponding to the intersections can be changed accordingly.

When the numerical aperture of the recording lens is N.A. and a wavelength of the recording laser beams is $\lambda$, a beam diameter $\Phi$ of the recording laser beam passing the recording lens where its center intensity is $1/e^2$ is expressed by an equation:

$$\Phi=0.637\lambda/(N.A.)$$

When a focal length of the recording lens is f and the diameter of the incident beam is w, the beam diameter $\Phi$ is expressed by an equation:

$$\Phi=1.27f\cdot(\lambda/w)$$

According to the above relationship equations, an optimum beam diameter for forming the optimum projecting parts 5 of the resist can be obtained by changing the intensity of the recording laser beams and the numerical aperture of the recording lens or the diameter of the incident beam.

Next, how to determine the shape of the projecting parts 5 of the resist will be discussed below.

When a ratio (B/A) of an etching rate A of the resist and an etching rate B of the material of the stamper substrate 1 is a selective ratio $\alpha$, in FIGS. 12A and 12B, the breadth $W_5$ of the bottom part of the projecting part 5, breadth $W_3$ of the bottom part of the signal projection 6, the breadth $W_6$ of the upper face part of the projecting part 5, the breadth $W_4$ of the upper face part of the signal projection 6 after the etching and the ashing, the tilt angle $\theta_5$ of the side wall of the projecting part 5, and the tilt angle $\theta_4$ of the side wall of the signal projection 6 after the etching and the ashing are set to hold the following relationships:

$$W_5=W_3+k_1\cdot(1/\alpha)$$

$$W_6=W_4+k_2\cdot(1/\alpha)$$

$$\theta_6=\theta_4-k_3\cdot(1/\alpha)$$

wherein $k_1$, $k_2$, and $k_3$ are constants determined by the etching process condition, e.g., the etching rate of each material, an etching gas, a degree of vacuum, or the like. The constants satisfy, for instance, $k_1>0$, $k_2>0$, and $k_3>0$.

As is clear from the above equations, the breadth $W_5$ of the bottom part of the projecting part 5 is made larger than the breadth $W_3$ of the bottom part of the signal projection 6 by at least a product of a value ($1/\alpha$) inversely proportional to the select ratio a and the constant $k_1$, the breadth $W_6$ of the upper face part of the projecting part 5 is made larger than the breadth $W_4$ of the upper face part of the signal projection 6 by at least a product of the value ($1/\alpha$) inversely proportional to the select ratio a and the constant $k_2$, and the tilt angle $\theta_6$ of the side wall of the projecting part 5 is made smaller than the tilt angle $\theta_4$ of the side wall of the signal projection 6 by a product of the value ($1/\alpha$) inversely proportional to the select ratio a and the constant $k_3$.

Figure 13A:
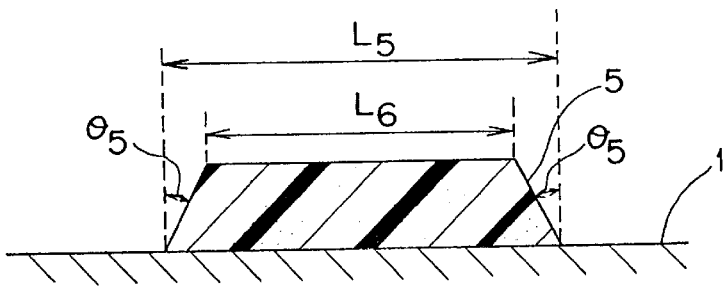
FIGS. 13A and 13B are sectional views each explanatory of a size relationship in a longitudinal direction between the signal projection form projecting part of the resist and the signal projection of the stamper substrate.
Figure 13B:
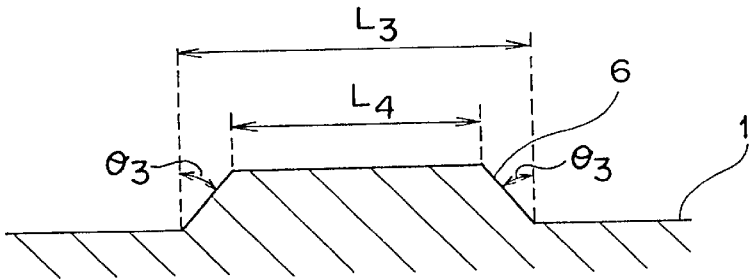

FIG. 13A is a side sectional view of the projecting part 5 of the resist in its longitudinal direction, and FIG. 13B is a sectional view of the signal projection 6 on the stamper substrate seen from the same longitudinal direction. In order for obtaining the optimum shape of the signal projection 6, from the same reasons as depicted in the sectional views of the optical disk in the track direction of FIGS. 12A and 12B, the length $L_5$ of the bottom part of the projecting part 5 of the resist, the length $L_6$ of the upper face part of the projecting part 5, and the tilt angle $\theta_5$ of a front, rear wall of the projecting part 5 are set according to the following equations when the length of the bottom part of the signal projection 6 is $L_3$, the length of the upper face part of the signal projection 6 is $L_4$ and the tilt angle of a front, rear wall of the signal projection 6 is $\theta_3$:

$$L_5=L_3+k_1\cdot(1/\alpha)$$

$$L_6=L_4+k_2\cdot(1/\alpha)$$

$$\theta_5=\theta_3-k_3\cdot(1/\alpha)$$

wherein $k_1$, $k_2$, and $k_3$ are constants determined by the etching process condition, e.g., an etching rate of each material, an etching gas, a degree of vacuum, or the like. The $k_1$, $k_2$, and $k_3$ are the constants used in the equations for obtaining the breadth $W_5$ of the bottom part of the projecting part 5, the breadth $W_6$ of the upper face part of the projecting part 5, and the tilt angle $\theta_6$ of the side wall of the projecting part 5.

As is made clear from the above equations, the length $L_5$ of the bottom part of the projecting part 5 is made larger than the length $L_3$ of the bottom part of the signal projection 6 by at least the product of the value ($1/\alpha$) inversely proportional to the select ratio $\alpha$ and the constant $k_1$, the length $L_6$ of the upper face part of the projecting part 5 is made larger than the length $L_4$ of the upper face part of the signal projection 6 by at least the product of the value ($1/\alpha$) inversely proportional to the select ratio $\alpha$ and the constant $k_2$ and, the tilt angle $\theta_5$ of the front, rear wall of the projecting part 5 is made smaller than the tilt angle $\theta_3$ of the front, rear wall of the signal projection 6 by the product of the value ($1/\alpha$) inversely proportional to the select ratio a and the constant $k_3$.

Then, how to change the length $L_5$ of the bottom part and the length $L_6$ of the upper face part of the projecting part 5 will be described.

Figure 15A:
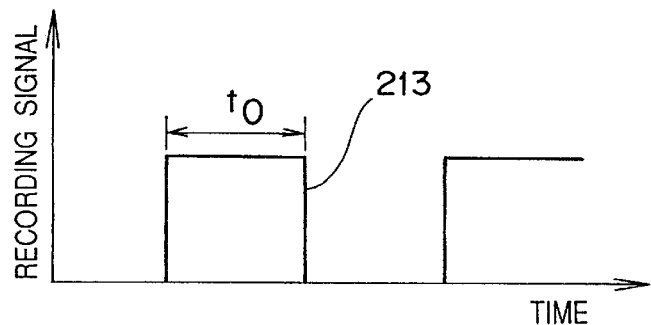
FIGS. 15A, 15B, 15C, and 15D are respectively a relationship diagram between an on-off of laser beams and a time when the sectional size in the longitudinal direction of the signal projection form projecting part of the resist changes in the 10th embodiment of the present invention, a relationship diagram between an irradiation power of laser beams corresponding to signal pulses and the time in FIG. 15A, a relationship diagram between a cumulative exposure amount of irradiated laser beams of FIG. 15B and the time, and a plan view of the signal projection form projecting part which is formed after development in consequence of the above irradiation.

FIG. 15A illustrates the recording signal, more specifically, that the recording laser beams are irradiated for a time $t_0$ while a signal pulse 213 is On. An axis of ordinate is an axis showing the On or Off of the recording signal and, an axis of abscissa is a time axis.

Figure 15B:
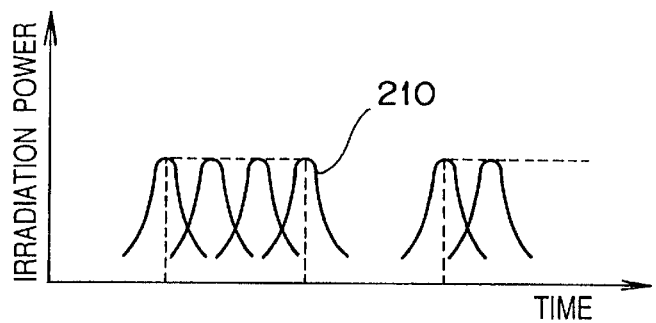

An axis of ordinate of FIG. 15B shows an irradiation power of the recording laser beams corresponding to the signal pulse 213, while an axis of abscissa shows a time. A beam profile 210 in FIG. 15B is the beam profile 210 of FIG. 14A.

Figure 15C:
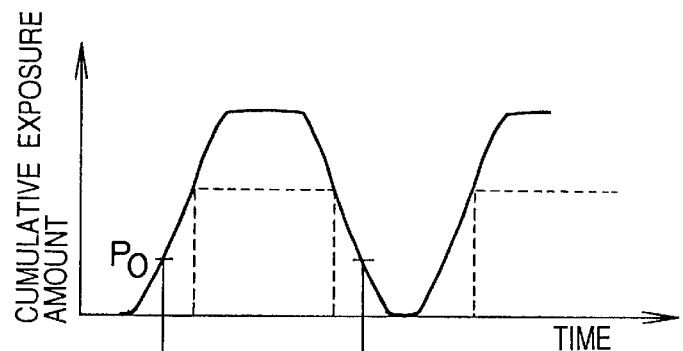

An axis of ordinate of FIG. 15C indicates a cumulative exposure amount of the recording laser beams of the beam profile 210 when irradiated to the resist layer 2. An axis of abscissa shows a time.

Figure 15D:
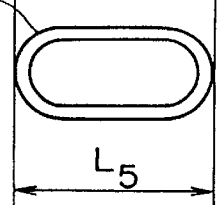

FIG. 15D shows the projecting part 5 formed after the development in consequence of the irradiation to the resist layer 2.

When the cumulative exposure amount is P0 in FIG. 15C, namely, the threshold where the resist is started to be obstructed from dissolving as explained in relation to FIGS. 14A and 14B, the length of the bottom part of the projecting part 5 becomes $L_5$ in the drawing. In other words, for changing the length of the projecting part 5, the time $t_0$ of the signal pulse 213 in FIG. 15A should be changed, which corresponds to changing a ratio of the On and Off of the signal, i.e., duty of the signal.

According to the 10th embodiment, the optimum shape of the projecting part 5 of the resist can be obtained by changing parameters which can be finely adjusted as mentioned above (for instance, intensity of the laser beams, diameter of the incident beam to the recording lens, duty of the recording signal, or the like). More specifically, the breadth or length of the projecting part 5 of the resist formed on the stamper substrate 1 after the development is made larger than the breadth or length required for the signal pit 160 of the optical disk, that is, made larger while the etching process condition is taken into account, whereby the retreat (reduction) of the end part of the projecting part of the resist as the mask at the time of etching and the transfer failure at the time of molding the optical disk are eased. The shape of the pits of the optical disk after being molded is accordingly more ideal than is conventional. More concretely, the breadth or length of the projecting part 5 of the resist is made larger than the breadth or length of the signal pit of the optical disk by at least the value inversely proportional to the select ratio at the dry etching the resist and the stamper substrate 1, whereby an accuracy in shape of the signal pits 160 by the etching can be further enhanced.

At the same time, the tilt angle of the side wall of the projecting part of the resist formed on the stamper substrate after the development is made equal to or more acute than the tilt angle of the side wall required for the signal pit of the optical disk, whereby the retreat (reduction) of the end part of the projecting part of the resist as the mask at the time of etching and the transfer failure at the time of molding the optical disk are eased, and eventually the pit shape of the optical disk after molded becomes more ideal than is conventional. Specifically, when the tilt angle of the side wall of the projecting part of the resist is made smaller than the tilt angle of the side wall of the signal pit of the optical disk by the value inversely proportional to the select ratio at the time of dry etching of the resist and the stamper substrate, the shape accuracy of the signal pit 160 by the etching is enhanced further.

As a concrete way for changing the process condition, the laser beam profile is changed, and at the same time the recording laser beams are irradiated so that the time width of the recording signal pulse 213 of the recording laser beams is longer than the time necessary for the signal pit length of the optical disk by at least the value inversely proportional to the select ratio a at the time of dry etching of the resist and the stamper substrate 1. The length or the breadth or the tilt angle of the projecting part 5 can be changed accordingly. In practice, the shape of the optical disk after being molded with which the optimum playback characteristic is exerted is obtained from experiments by changing the above parameters. The signal projections of the stamper and the pits of the molded optical disk according to the present invention can be realized in optimum shapes.

Parameters to be finely adjusted daily are the laser beam intensity, diameter of the incident beam to the recording lens, duty of the recording signal, and the like. The laser beam profile is preferably monitored and managed at all times.

In the production of optical disks, conditions of later processes such as development, etching, molding, or the like may delicately change, thereby gradually changing the signal pits of the optical disk. However, each of the parameters can be finely adjusted according to the method of the present invention, so that the signal pit of the optical disk can be easily returned to an optimum value. Moreover, which of the later processes changes can be accurately grasped by managing each parameter, thus enabling sure process management.

As described hereinabove, the stamper, the mastering method, and the optical disk of the present invention realize a shape of good quality for optimizing the playback signals. The yield is good because the process management is facilitated.

Although the stamper substrate 1 is a single layer in the foregoing description, needless to say, the 10th embodiment of the present invention is applicable to the stamper substrate 21 in the double layer structure with the etching layer 21b set on the base layer 21a as shown in FIGS. 3A–3F.

An appropriate optional combination among the above various embodiments can exhibit the effects of the respective embodiments.

The 10th embodiment of the present invention can effectuate the following actions and effects.

According to the direct dry mastering apparatus for the stamper for optical disks of the present invention, the optical disk stamper can be manufactured without wetting the stamper substrate with the cleaning liquid and chemical liquid after the resist is formed thereto. If the inner or outer diameter of the stamper substrate is machined to the stamper size matching the mold of the optical disk-molding machine before the resist is formed to the stamper substrate, the probability of generation of defects in later processes is reduced and the yield can be increased further.

As above, the present invention enables even inexperienced people to produce the stampers of good yield and good quality in a short time with production costs lowered.

In the present invention, the optimum shape of the projecting part of the resist can be obtained by changing the parameters which can be finely adjusted (e.g., laser beam intensity, diameter of the incident beam to the recording lens, duty of the recording signal, or the like). Specifically, the breadth or the length of the projecting part of the resist formed on the stamper substrate after the development is made larger than the breadth or the length required to the signal pit of the optical disk, that is, made larger with the etching process condition taken into consideration. Accordingly, the retreat (reduction) of end parts of the projecting parts of the resist as the mask at the time of etching and transfer failure at the time of molding the optical disk are lessened. Eventually, pits of the optical disk after being molded become closer to an ideal shape than in the prior art. More specifically, the breadth or the length of the projecting part of the resist is made larger than the breadth or the length of the signal pit of the optical disk by at least the value inversely proportional to the select ratio at the time of dry etching the resist and stamper substrate, so that the accuracy in shape of the signal pits by etching is further enhanced more.

The tilt angle of the side wall of the projecting part of the resist formed on the stamper substrate after the development is made equal to or smaller than the tilt angle of the side wall of the signal pit of the optical disk, thereby easing the retreat (reduction) of end parts of the projecting parts of the resist as the mask at the time of etching and transfer failure at the time of molding the optical disk and, eventually bringing the pits of the optical disk after being molded to a more ideal shape than is conventional. More specifically, the tilt angle of the side wall of the projecting part of the resist is made smaller than the tilt angle of the side wall of the signal pit of the optical disk by the value inversely proportional to the select ratio at the dry etching to the resist and the stamper substrate, whereby the shape accuracy of the signal pits by the etching can be enhanced more.

As a concrete method for changing the process condition, the laser beam profile is changed and moreover, the recording laser beams are irradiated so that the time width of the recording signal pulse of the recording laser beam is longer than the time necessary for the signal pit length of the optical disk by at least the value inversely proportional to the select ratio at the time of dry etching the resist and the stamper substrate, whereby the length or the breadth or the tilt angle of the projecting parts can be changed.

Accordingly, the signal projections of the stamper and the pits of the molded optical disk by the present invention can be realized in optimum forms.

Parameters to be finely adjusted daily are, e.g., the laser beam intensity, diameter of the incident beam to the recording lens, duty of the recording signal, and the like. The laser beam profile is preferably monitored and managed at all times.

During the production of optical disks, the process condition in after processes such as development, etching, molding, and the like is supposed to delicately vary and gradually change signal pits of the optical disk. However, since the respective parameters can be finely adjusted in the method of the present invention, signal pit of the optical disk can be returned to an optimum value easily. Also, after processes changes can be accurately grasped so long as each parameter is managed. Process management is accordingly surely carried out.

The stamper, the mastering method, and the optical disk according to the present invention as described above realize a shape of good quality with which playback signals are optimized. The process management can be easily performed and the yield can be improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for mastering a stamper for optical disks, said method comprising:

forming an etching layer of tantalum on a base layer of nickel of a stamper substrate;

thereafter, irradiating laser beams modulated according to a recording signal and converged by a recording lens to a surface of a resist layer formed on the etching layer of the stamper substrate while rotating the stamper substrate, thereby forming exposed and unexposed parts, thereafter, developing the stamper substrate, thereby forming projections on the resist layer corresponding to the exposed part, etching the etching layer with the projections of the resist layer serving as a mask; and removing the exposed part of the resist layer, thereby forming, on the etching layer, projections corresponding to the recording signal.

2. A method as defined in claim 1, wherein said forming of the etching layer on the base layer comprises forming the tantalum layer on the nickel substrate through sputtering, and said etching of the etching layer comprises dry-etching the tantalum layer with the projections of the resist layer serving as the mask.

3. A method as defined in claim 2, wherein a breadth or a length of each of the projections of the resist layer is made larger than a breadth or a length of each of the projections of the tantalum layer, respectively, by at least a product ($k_2 \times A/B$) of a value inversely proportional to a select ratio (B/A) of an etching rate A of resist of the resist layer at said dry-etching and an etching rate B of tantalum of the tantalum layer and a constant $k_2$.

* * * * *

UNITED STATES PATENT AND TRADEMARK OFFICE
CERTIFICATE OF CORRECTION

PATENT NO.    : 6,706,465 B1
DATED         : March 16, 2004
INVENTOR(S)   : Kazuhiko Sano Page 1 of 1

It is certified that error appears in the above-identified patent and that said Letters Patent is hereby corrected as shown below:

<u>Drawings,</u>
Figure 7, Sheet 6, change reference numeral "11" to -- 110b --, change reference numeral "10" to -- 110a --, add bracket -- } -- encompassing both reference numeral 110a and reference numeral 110b, and add the reference numeral -- 110 -- to the bracket "}".
Figure 8, Sheet 7, change each of reference numerals "12" through "17" to reference numerals -- 112 -- through -- 117 --, respectively.

<u>Column 32,</u>
Line 15, change "," to -- ; -- and
Line 18, change "," to -- ; --.

Signed and Sealed this

Twenty-ninth Day of June, 2004

JON W. DUDAS
*Acting Director of the United States Patent and Trademark Office*